(12) United States Patent
Skladman et al.

(10) Patent No.: US 12,097,970 B2
(45) Date of Patent: Sep. 24, 2024

(54) REFUELING DEVICE

(71) Applicant: ISRAEL AEROSPACE INDUSTRIES LTD., Lod (IL)

(72) Inventors: Rami Skladman, Lod (IL); Ilan Darmon, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days.

(21) Appl. No.: 18/017,741

(22) PCT Filed: Jul. 25, 2021

(86) PCT No.: PCT/IL2021/050897
§ 371 (c)(1),
(2) Date: Jan. 24, 2023

(87) PCT Pub. No.: WO2022/024112
PCT Pub. Date: Feb. 3, 2022

(65) Prior Publication Data
US 2023/0264829 A1    Aug. 24, 2023

(30) Foreign Application Priority Data

Jul. 27, 2020    (IL) .......................................... 276321

(51) Int. Cl.
*B64D 39/04*    (2006.01)
(52) U.S. Cl.
CPC ................... *B64D 39/04* (2013.01)
(58) Field of Classification Search
CPC ................ F42B 10/50; B64D 39/04
See application file for complete search history.

(56) References Cited

U.S. PATENT DOCUMENTS 7,562,847 B2    7/2009 Jones
7,775,147 B2 *  8/2010 Crawford ................ F42B 10/50
                                                         244/113
(Continued)

FOREIGN PATENT DOCUMENTS

GB      2237251 A    5/1991
IL       253015     12/2017
(Continued)

OTHER PUBLICATIONS

Shortal, "Effect of Retractable-Spoiler Location on Rolling and Yawing-Moment Coefficients", Langley Memorial Aeronautical Laboratory, Jul. 1934, 18 pages.
(Continued)

*Primary Examiner* — Joshua J Michener
*Assistant Examiner* — Michael B. Kreiner
(74) *Attorney, Agent, or Firm* — Dorsey & Whitney LLP

(57) ABSTRACT

Refueling devices for use in in-flight refueling operation are provided, including a body configured for being towed by a tanker aircraft and having a boom member that has a fuel delivery nozzle, a spatial control system and a longitudinal control system. The longitudinal displacement control system includes at least one panel element defining a front panel projected area orthogonal to a body longitudinal axis, each panel element being controllably and reversibly deployable incrementally to each one of a plurality of successive deployed positions between a fully retracted position and a fully deployed position, to provide a respective reversible incrementally increasing aft force to the refueling device at least during the in-flight refueling operation.

22 Claims, 7 Drawing Sheets

(56) References Cited

U.S. PATENT DOCUMENTS

| | | | |
|---|---|---|---|
| 8,026,465 B1* | 9/2011 | Fraysse, Jr. | F42B 10/54 |
| | | | 244/3.22 |
| 9,062,945 B2* | 6/2015 | Bruns | F42B 10/14 |
| 9,150,311 B2* | 10/2015 | Rix | G05D 1/101 |
| 9,227,735 B2* | 1/2016 | Kusnitz | B64D 39/06 |
| 11,919,655 B2* | 3/2024 | Meidad | B64D 39/04 |
| 2014/0306063 A1 | 10/2014 | Kusnitz | |
| 2014/0346279 A1 | 11/2014 | Foo et al. | |
| 2015/0136911 A1 | 5/2015 | Rix et al. | |
| 2016/0075441 A1* | 3/2016 | Elsawah | B64D 39/04 |
| | | | 244/135 A |
| 2021/0300585 A1* | 9/2021 | Dibb | B64C 9/00 |
| 2023/0182921 A1* | 6/2023 | Meidad | B64D 39/04 |
| | | | 244/135 A |

FOREIGN PATENT DOCUMENTS

| | | | |
|---|---|---|---|
| WO | 2013102903 A2 | 7/2013 | |
| WO | 2013102906 A2 | 7/2013 | |

OTHER PUBLICATIONS

Weick, et al., "Development of the N.A.C.A. Slot-Lip Aileron", Langley Memorial Aeronautical Laboratory, Nov. 1935, 24 pages.
International Search Report and Written Opinion for International Application No. PCT/IL2021/050897, mailed Oct. 24, 2021 (10 pages).

* cited by examiner

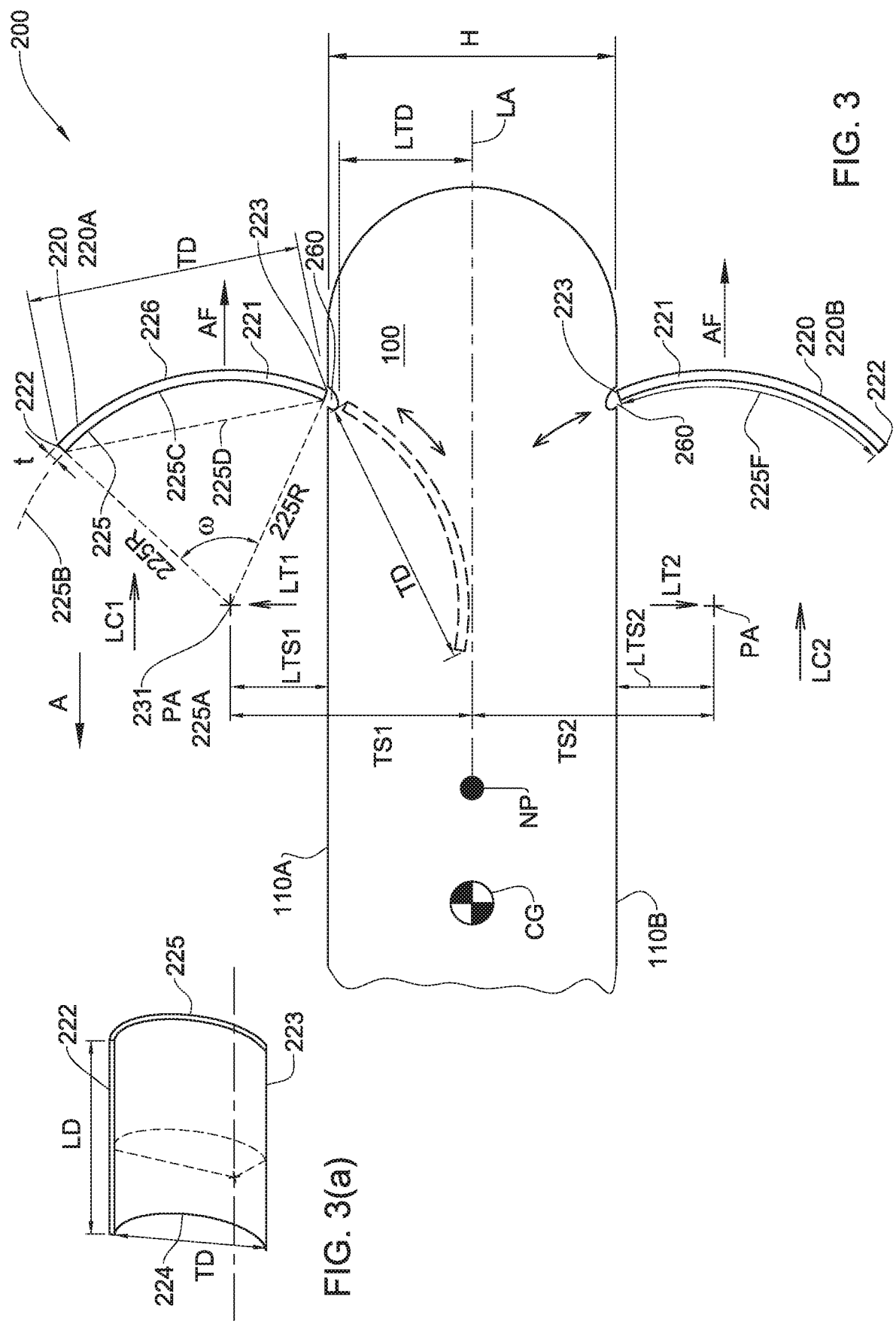

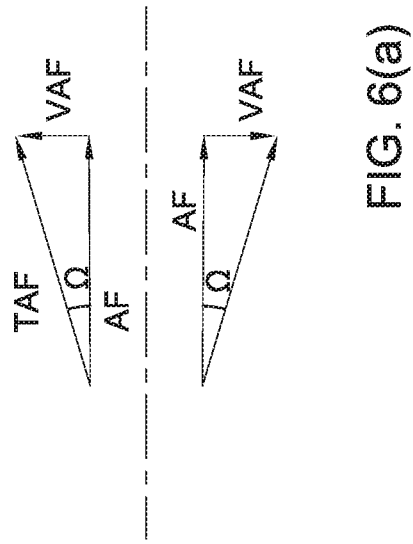
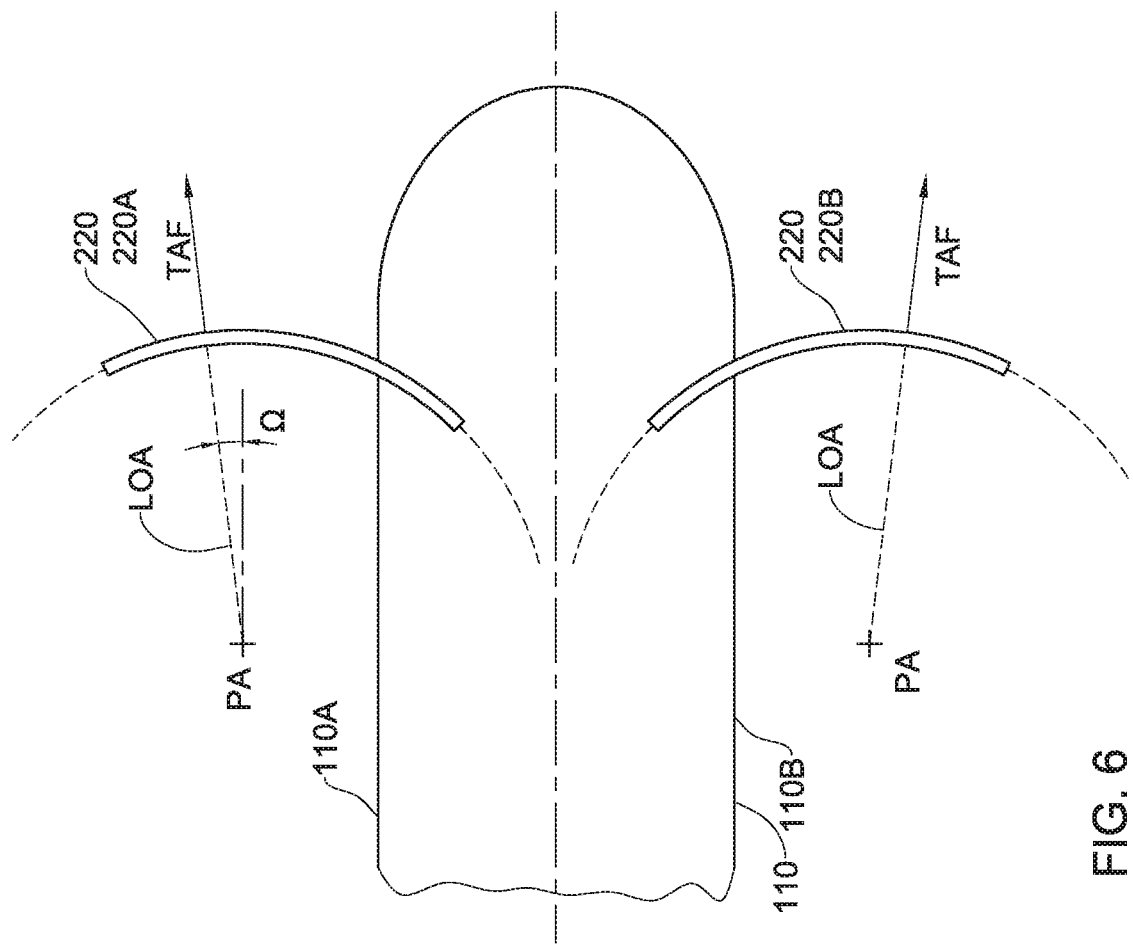
FIG. 6

REFUELING DEVICE

TECHNOLOGICAL FIELD

The presently disclosed subject matter relates to in-flight refueling systems, in particulars to boom-type in-flight refueling systems.

BACKGROUND

Airborne refueling (also referred to interchangeably herein as air refueling, in-flight refueling, air to air refueling (AAR), aerial refueling, tanking, and the like) refers to the process of transferring fuel from a tanker aircraft to a receiver aircraft during flight.

Two types of airborne refueling systems are currently in use for refueling airborne military aircraft:

the so-called "hose and drogue" system, used by the US Navy and many non-US air forces;

the so-called "boom and receptacle" or "flying boom" system, used by the US Air Force, and also used by Israel, Turkey and the Netherlands.

In the hose and drogue system, the refueling aircraft is provided with one or more non-rigid refueling lines, at the end of each of which there is a drogue which functions as a stabilizer and includes a receptacle, while the receiver aircraft is fitted with a probe that is configured for engaging with the receptacle. In use, the drogue is not actively controlled, but rather aligns itself freely in the airflow aft of the tanker. The pilot of the receiver aircraft controls the flight path thereof to ensure engaging contact between the probe and the receptacle. Thereafter, the receiver aircraft is refueled via the refueling line and probe.

In the boom and receptacle system, the tanker includes a so-called "flying boom", which is a rigid tube that telescopes outwardly and is gimbaled to the rear of the tanker aircraft, and is otherwise retracted into the tanker fuselage when not in use. The boom carries a fuel line and comprises a fuel transfer nozzle at the end thereof, and the boom is equipped with adjustable flight control surfaces. Once the tanker and receiver aircraft are in close proximity and flying in formation, with the receiver aircraft at a position behind the tanker within an air refueling envelope (i.e., safe limits of travel for the boom with respect to the receiver aircraft and within which contact between the receiving aircraft and the boom is safe), a dedicated operator in the tanker controls the position of the boom via the control surfaces, and inserts the end of the boom including the nozzle into a receptacle provided on an upper part of the receiving aircraft, ensuring proper mating between the nozzle and receptacle, after which fuel transfer can begin. During refueling, and while the boom is engaged with the receptacle, the pilot of the receiver aircraft must continue to fly within the air refueling envelope, and if the receiver aircraft approaches these limits the operator in the tanker requires the receiver aircraft pilot to correct the position thereof, and if necessary the boom is disconnected to prevent accidents. All current tankers of this type carry a single boom and can refuel a single receiver aircraft of this type at a time.

In addition, there are some tankers that comprise a flying boom system and at least one hose and drogue system as well, and are commonly known as Multi-Point Refueling Systems (MPRS). In some cases a hose and drogue system is provided at the aircraft tail, and thus only this system or the flying boom system may be used at any one time. In other cases, two under-wing hose and drogue pods, known as Wing Air Refueling Pods (WARPs), can be provided, one under each wing, in addition to the flying boom system.

By way of general background, WO 2013/102903 and WO 2013/102906, assigned to the present Assignee, disclose a variety of refueling devices, systems and methods for use in in-flight refueling. In one example one such device is towed by a tanker aircraft via a fuel hose at least during in-flight refueling, and has a boom member with a boom axis. The boom member enables fuel to be transferred from the fuel hose to a receiver aircraft along the boom axis during in-flight refueling. The device maintains a desired non-zero angular disposition between the boom axis and a forward direction at least when the refueling device is towed by the tanker aircraft in the forward direction via the fuel hose.

Also by way of general background, U.S. Pat. No. 7,562,847 discloses an autonomous in-flight refueling hose end unit including a first end configured to be coupled to a fuel hose of a tanker aircraft. and a second end configured to be coupled to receiver aircraft and adjustable control surfaces, and a flight control computer autonomously controls the control surfaces to fly the refueling hose end into contact with the receiver aircraft.

Also by way of general background, in GB 2,237,251 an in flight refueling apparatus mountable on a tanker aircraft has a probe receptor coupled with a fuel line and is arranged to be deployed outboard of the aircraft, and can be provided on a drogue or a boom. In one mode, the apparatus is arranged to provide a parameter which is representative of the deviation of the path of the receptor from a predetermined initial path for actuating control means for changing automatically the position of the receptor relative to the initial path. In another mode, a parameter which is representative of the relative angular position of the receptor with respect to the probe of an approaching refueling aircraft for actuating control means for changing automatically the relative angular position to achieve alignment of receptor and probe.

Also by way of general background, US 2014/346279A discloses a trailing boom system for aerial refueling and a method for aerial refueling of multiple receiver aircraft. The trailing boom system for aerial refueling includes a parent pod capable of being connected to a wing of an aircraft, and a detachable pod releasable from the parent pod, the detachable pod including an extendible boom for refueling aircraft in flight.

Also by way of general background, US 2014/306063 discloses a refueling system that may include a refueling hose and a refueling drone coupled to the hose aft end. The refueling drone may be rearwardly deployable from the tanker aircraft such that the refueling drone is towed by the refueling hose behind the tanker aircraft. The refueling drone may be engaged to a receiver aircraft for transferring fuel from the tanker aircraft to the receiver aircraft.

Acknowledgement of the above references herein is not to be inferred as meaning that these are in any way relevant to the patentability of the presently disclosed subject matter.

GENERAL DESCRIPTION

According to a first aspect of the presently disclosed subject matter there is provided a refueling device for use in in-flight refueling operation, comprising:

(a) a body configured for being towed by a tanker aircraft in a forward direction via a fuel hose at least during in-flight refueling operation, the body having a body longitudinal axis;

(b) a boom member carried by the body, the boom member having a fuel delivery nozzle, the fuel delivery nozzle being configured for selectively engaging with a fuel receptacle in a receiver aircraft to enable fuel to be transferred from said fuel hose to the receiver aircraft during said in-flight refueling operation;

(c) spatial control system configured for selectively providing stability and control to the refueling device;

(d) a longitudinal displacement control system, comprising:

at least one panel element defining a front panel projected area orthogonal to the body longitudinal axis, each said panel element being controllably and reversibly deployable incrementally to each one of a plurality of successive deployed positions between a fully retracted position and a fully deployed position, to provide a respective reversible incrementally increasing aft force to the refueling device at least during the in-flight refueling operation.

For example:

in the fully retracted position the respective said panel element is retracted within the body and a proportion of said front panel projected area exposed to an airflow over the body, at least during the in-flight refueling operation, is at a minimum, thereby providing a respective minimum said aft force to the refueling device;

in the fully deployed position the respective said proportion of the front panel projected area of said panel element exposed to the airflow, at least during the in-flight refueling operation, is at a maximum, thereby providing a respective maximum said aft force to the refueling device, and in each said successive deployed position a corresponding said proportion of said front panel projected area of the panel element is correspondingly exposed to the airflow, at least during the in-flight refueling operation, thereby providing a corresponding said aft force to the refueling device;

a magnitude of said proportion of said front panel projected area is reversibly incrementally increased as the panel element is deployed from the fully retracted position to the deployed position via said successive deployed positions to thereby provide a controllable and reversibly incrementally increasing said aft force having a force magnitude respectively increasing from said respective minimum aft force to said respective maximum aft force.

Additionally or alternatively, for example, at least one said panel element is in the form of a curved plate having a concave cylindrical surface facing the forward direction, and a center of curvature. For example, the concave cylindrical surface comprises arc-shaped cross-sections, each subtending an angle at the center of curvature of between 60 degrees and 90 degrees.

Additionally or alternatively, for example, the at least one said panel element is pivotably mounted to device to allow for pivoting of the at least one said panel element about a pivoting axis co-axial with the center of curvature. For example, said pivoting axis is located longitudinally aft of a center of gravity of the refueling device.

Additionally or alternatively, for example, said pivoting axis is located at a longitudinal position between 60% and 90% of a longitudinal dimension of the body.

Additionally or alternatively, for example, each said pivoting axis is transversely located at a transverse position outside of the body. For example, said pivoting axis is located at a transverse position between 15% and 50% of a transverse dimension of the body.

Additionally or alternatively, for example, each said panel element has a height to width aspect ratio in the range 0.3 to 0.9.

Additionally or alternatively, for example, said pivoting axis is parallel to a pitch axis of the refueling device.

Additionally or alternatively, for example, said body comprises a corresponding slot for each said panel element, into which the respective said panel is retracted into in the respective said fully retracted position.

Additionally or alternatively, for example, each panel element moves along an arc, corresponding to said curvature, about the respect, pivot axis, between said fully retracted position and said fully deployed position.

Additionally or alternatively, for example, the refueling device comprises an actuator for controllably causing each said panel element to be deployed between the respective said fully retracted position and the respective said deployed position.

Additionally or alternatively, for example, the refueling device comprises two said panel elements, wherein one said panel element is mounted with respect to an upper part of the body, and wherein the other said panel element is mounted with respect to a lower part of the body.

Additionally or alternatively, for example, the refueling device comprises two said panel elements, wherein one said panel element is mounted with respect to a port part of the body, and wherein the other said panel element is mounted with respect to a starboard part of the body.

Additionally or alternatively, for example, the two said panel elements are pivotably mounted to the body at the same longitudinal spacing from a forward end of the body.

Additionally or alternatively, for example, the refueling device is configured for synchronized deployment of the two said panel elements.

Additionally or alternatively, for example, the refueling device further comprises a controller for controlling said magnitude of said aft force by controlling said proportion of said front panel projected area. For example, said controller is configured for controlling said magnitude of said aft force to provide and maintain a tension in said hose within a predetermined tension range. Additionally or alternatively, for example, said controller is configured for controlling said magnitude of said aft force to provide a desired forward to aft displacement of the refueling device with respect to the tanker aircraft.

Additionally or alternatively, for example, said boom member has refueling nozzle at a free end thereof, and a boom axis passing through the refueling nozzle, wherein at least during in-flight refueling said boom axis is at a non-zero angular deposition with respect to the body axis. For example, the boom member is reversibly pivotable with respect to the body, between a boom stowed position and a boom deployed position, wherein in the boom stowed position the refueling nozzle is closes to the body, and wherein in the boom deployed position engagement with the fuel receptacle of the receiver aircraft is possible. Alternatively, for example, said boom member is in fixed spatial relationship with respect to the body.

Additionally or alternatively, for example, said spatial control system is further configured for selectively providing control moments in at least one of pitch, yaw and roll wherein to enable the refueling device to be flown while towed by the tanker aircraft in said forward direction via said fuel hose.

Additionally or alternatively, for example, said spatial control system comprises selectively controllable aerodynamic control system. For example, said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces. For example, said forward set of aerodynamic control surfaces comprises a canard configuration, and said aft set of aerodynamic control surfaces comprises one or more wing elements. Additionally or alternatively, for example, said aft set of aerodynamic control surfaces comprises an H-wing configuration, comprising two vertical wing stabilizers, one each on either side of a respective wing. Additionally or alternatively, for example, said forward set of aerodynamic control surfaces comprises an H-canard configuration, comprising two vertical canard stabilizers, one each on either side of a respective canard.

Additionally or alternatively, for example, said spatial control system is configured for enabling the refueling device to be steered in one, or two, or three degrees of freedom in translation, and in one, or two, or three degrees of freedom in rotation, independently of the tanker aircraft or of the refueling aircraft.

Additionally or alternatively, for example, said longitudinal displacement control system is different from the spatial control system.

Additionally or alternatively, for example, the refueling device comprises a force generating arrangement configured for selectively generating a force along said aft boom axis in a direction towards said fuel delivery nozzle. For example, said force generating arrangement is configured for selectively generating said force along said aft boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle.

Additionally or alternatively, for example, said body comprising a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication.

Additionally or alternatively, for example, the refueling device further comprises a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft.

Additionally or alternatively, for example, the refueling device further comprises a suitable controller for controlling operation thereof.

According to a second aspect of the presently disclosed subject matter there is provided a refueling system comprising a refueling fuel reservoir connected to a refueling device via a hose, the refueling device being as defined herein regarding the aforementioned first aspect of the presently disclosed subject matter.

According to a third aspect of the presently disclosed subject matter there is provided a tanker aircraft comprising at least one refueling system as defined herein regarding the aforementioned second aspect of the presently disclosed subject matter.

According to a fourth aspect of the presently disclosed subject matter there is provided a method for in-flight refueling, comprising:
  providing a tanker aircraft as defined herein regarding the aforementioned third aspect of the presently disclosed subject matter;
  deploying the refueling device aft of the tanker aircraft when airborne;
  operating the longitudinal displacement control system to provide at least one of:
    (i) a desired tension in the hose;
    (ii) a desired fore or aft displacement of the refueling device.

A feature of at least one example of the presently disclosed subject matter is that there is provided a refueling device having longitudinal displacement control system in which the respective one panel element is configured such that the corresponding center-of-pressure (point of application) of the aerodynamic forces acting on the panel element converge toward the corresponding hinge axis of the panel element.

Another feature of at least one example of the presently disclosed subject matter is that, in examples in which at least one respective one panel element is in the form of a plate having an actual or effective center of curvature and a concave surface facing the forward direction, and wherein the panel element is pivotable about a pivoting axis co-axial with the center of curvature, actuation loads for deploying the panel element between the fully retracted position and the fully deployed position can be minimized. In particular, such actuation loads can be significantly less than for corresponding systems in which the corresponding center-of-pressure (point of application) of the aerodynamic forces acting on the panel element do not converge toward the corresponding hinge axis.

Another feature of at least one example of the presently disclosed subject matter is that, in examples in which at least one respective one panel element is in the form of a curved plate, the drag coefficient (normalized by the panel frontal area) of such a panel element can exceed 1.

Another feature of at least one example of the presently disclosed subject matter is that the drag force generated by the longitudinal displacement control system can be controllably changed in an incremental manner by correspondingly incrementally retracting or deploying the respective panel elements, thereby allowing for accurate control of the drag force generated by the longitudinal displacement control system.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 3 is a cross-sectional side view of the aft end of the refueling device according to the example of FIG. 1(a), showing the respective longitudinal displacement control system in the fully deployed position; FIG. 3(a) is a front isometric view of a panel element of the example of the longitudinal displacement control system of FIG. 3.

FIG. 6 is a cross-sectional side view of the aft end of the refueling device according to the example of FIG. 3, illustrating the forces generated in respective longitudinal displacement control system in the fully deployed position; FIG. 6(a) is a vector force diagram of the forces generated in the example of FIG. 6.

DETAILED DESCRIPTION

Figure 1A:
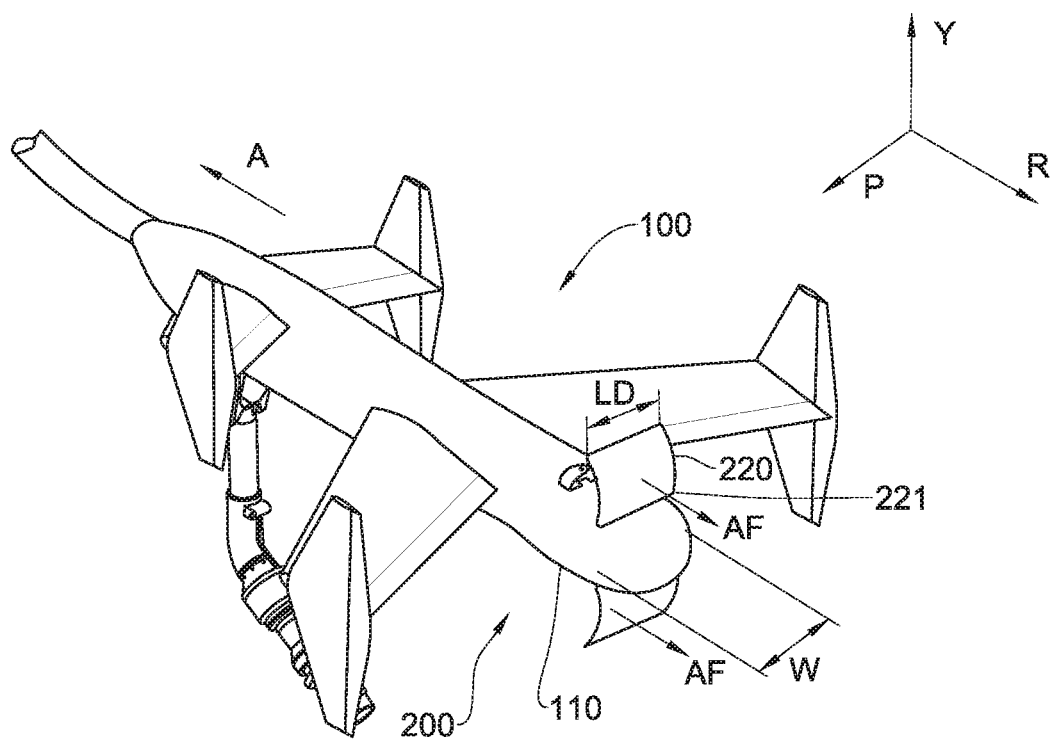
FIG. 1(a) is an aft-top isometric view of a refueling device according to of an example of the presently disclosed subject matter, with the respective longitudinal displacement control system in the fully deployed position.

Referring to FIGS. 1(a) to 2(b), a refueling device for use in in-flight refueling operation, according to one example of the presently disclosed subject matter, generally designated 100, comprises a body 110, a boom member 130, a spatial control system 160, and a longitudinal displacement control system 200.

Figure 7:
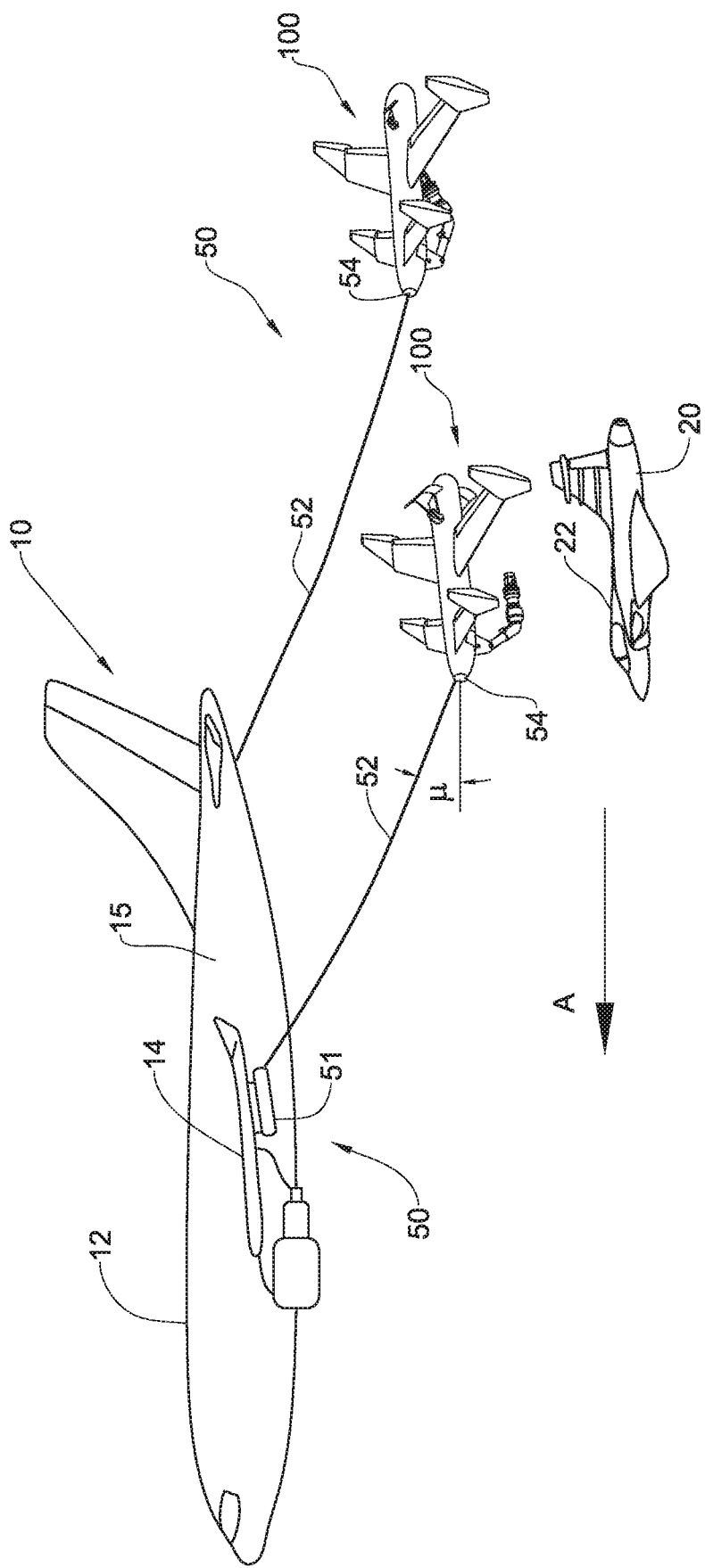
FIG. 7 is a side view of a tanker system according to an example of the presently disclosed subject matter.

As will become clearer herein, and referring also to FIG. 7, the refueling device 100, and in particular the body 110 is configured for being towed by a tanker aircraft 12 in a forward direction A via a fuel hose 52 at least during in-flight refueling operation, the body 110 having a body longitudinal axis LAB and a neutral point NP (FIG. 3).

Furthermore, the boom member 130 is carried by the body 110, the boom member 130 having a fuel delivery nozzle 135, the fuel delivery nozzle 135 being configured for selectively engaging with a fuel receptacle in a receiver aircraft 20 to enable fuel to be transferred from the fuel hose 52 to the receiver aircraft 20 along during the in-flight refueling operation. Furthermore, the spatial control system 160 is configured for selectively providing stability and control to the refueling device 100.

Referring in particular to FIG. 7, a tanker system 10, according to one example of the presently disclosed subject matter, comprises the tanker aircraft 12 including one or more in-flight refueling systems 50. As will become clearer herein, each refueling system 50 comprises a refueling device 100.

In at least this example, the tanker aircraft 12 has three such in-flight refueling systems 50, one in-flight refueling system 50 carried by the port wing 14, another in-flight refueling system 50 carried by the starboard wing 16, and a third in-flight refueling system 50 located in the rear portion of the fuselage 15, and the tanker aircraft 12 is configured for in-flight concurrent refueling of up to three receiver aircraft 20. In alternative variations of this example the tanker aircraft 12 can have at least one, or two, or more than three in-flight refueling systems 50, arranged in any suitable configuration with respect to the tanker aircraft 12.

By way of non-limiting example, such a tanker aircraft 12 can be a suitably equipped Boeing 767, Boeing 747, or Airbus 330, and each receiver aircraft 20 can include any suitable aircraft, for example any one of suitably equipped F-15, or F-16, or F-35, or B1, or B2 stealth bomber, or other suitably equipped fighter, bomber or other aircraft. Alternatively, and also by way of non-limiting example, the tanker aircraft can be an unmanned aerial vehicle (UAV), and/or at least one of the receiver aircraft can be a UAV.

Also by way of non-limiting example, a refueling flight envelope for use with such a tanker system 10 can include a forward speed of between about 220 knots and about 320 knots (typically about 280 knots), and an altitude of between 500 ft and between about 30,000 ft to about 40,000 ft, and in general typically not below about 10,000 ft, in which refueling can take place between the tanker aircraft 12 and each receiver aircraft 20, flying in formation, depending on the operating limits of the tanker aircraft and of the receiver aircraft, as well as other factors.

In at least this example, and referring again to FIGS. 1(a) to 2(b), each in-flight refueling system 50 comprises an elongate, non-rigid, fuel delivery hose 52, reversibly extendible from the tanker aircraft 12. A first end (not shown) of the hose 52 is connected to a refueling fuel tank (not shown) carried by the tanker aircraft 12. For example, such a refueling fuel tank can be an internal fuel tank of the tanker aircraft 12, for example the tanker aircraft's own fuel tanks, or a special fuel reservoir mounted internally in the tanker aircraft 12, for example in the fuselage, or externally (for example carried in fuel pods).

The hose 52 is flexible and can be retracted into a roll up drum (not shown), suitably provided in the tanker aircraft 12, and selectively deployed therefrom when required.

The second (aft) end 54 of hose 52 is operatively connected to a respective refueling device 100 that is towed in a forward direction A by the tanker aircraft 12 via hose 52 when the hose 52 is extended and the tanker aircraft 12 is in flight.

In at least this example, one in-flight refueling system 50 is centrally-located and mounted with respect to the rear fuselage of the tanker aircraft 12, and each of the other two in-flight refueling systems 50 is comprised in a respective pod 51 that is attached to the underside of the respective wing.

Thus, and referring again to FIGS. 1(a) to 2(b), the refueling device according to a first example of the presently disclosed subject matter, generally designated 100, is configured for use with respect to an in-flight refueling system, for example at least one of the in-flight refueling systems 50 of the example of the tanker system 10 illustrated FIG. 7.

For convenience, and referring again to FIGS. 1(a) to 2(b), a roll axis R, a pitch axis P and a yaw axis Y can be conventionally defined with respect to the refueling device 100. The roll axis R is parallel to or co-axial with the longitudinal axis LAB of the device 100; the pitch axis P is generally in lateral and orthogonal relationship to the roll axis R (i.e., parallel to the horizontal when the body is at a zero roll angle); and yaw axis Y is in generally in transverse and orthogonal relationship to the roll axis R the pitch axis P (i.e., parallel to the vertical when the body is at a zero pitch angle).

Refueling device 100 is affixed to the end 54 of hose 52 and comprises body 110, which at least in this example is in the form of a generally elongate fuselage, and comprises a longitudinal axis LAB. While in at least this example the body 110 comprises a general oval or elliptical cross section, in alternative variations of this example the body 110 can have any other suitable cross-sectional shape, for example circular cross-section, polygonal cross-section, super-elliptical cross-section, and so on.

Figure 2A:
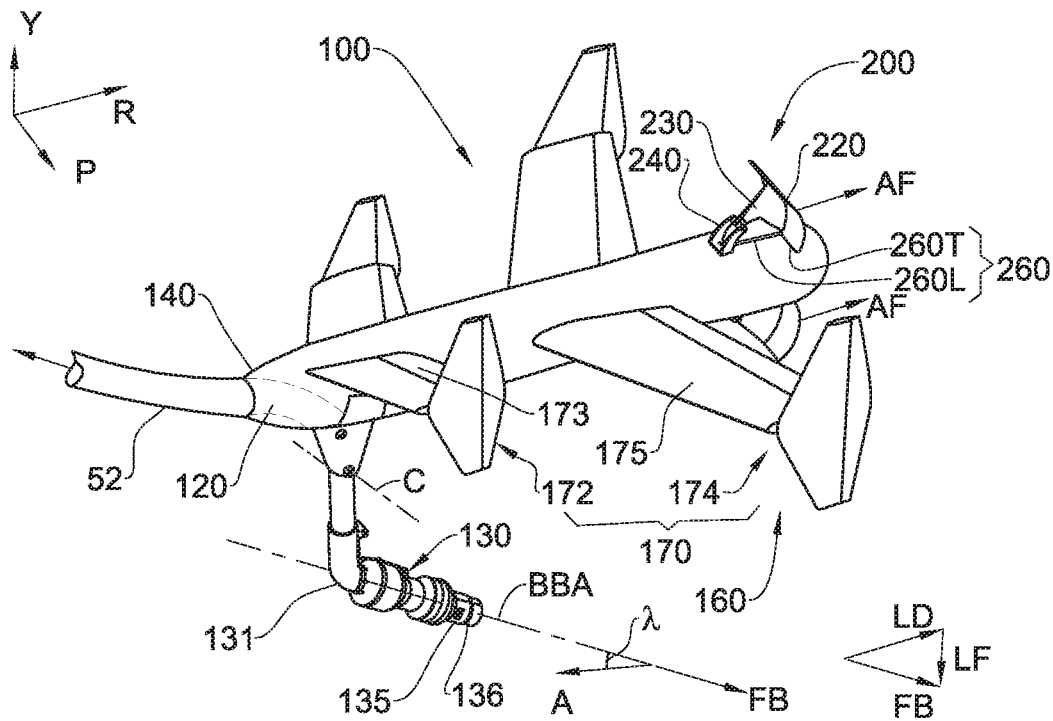
FIG. 2(a) is an front-top isometric view of the refueling device according to the example of FIG. 1(a), with the respective longitudinal displacement control system in the fully deployed position.

Referring in particular to FIG. 2(a), the body 110 comprises a fuel delivery lumen 120 and carries boom member 130 (which at least in this example is a substantially rigid boom member) in fluid communication with fuel delivery lumen 120. The boom member 130 comprises fuel delivery nozzle 135 at a terminus 136 i.e., at the aft end of the boom member 130. The nozzle 135 is configured for reversibly engaging with the fuel receptacle 22 of a receiver aircraft 20 (see also FIG. 7), and thus can comprise any conventional design of such nozzles, which are well known in the art, or indeed can comprise any other current or future design of such an in-flight refueling nozzle. While in at least this example, the boom member 130 is not extensible, in alternative variations of this example, the boom member 130 can instead be extensible, and comprise for example a plurality of telescopic elements.

The body 110 comprises a coupling 140 at forward end 114 thereof. The coupling 140 comprises a hose interface configured for connecting the lumen 120 to the hose 52, and thereby to the tanker aircraft 12. The coupling 140 can be configured for allowing relative rotation between the body 110 and the hose 52 while maintaining fluid communication between the lumen 120 and the hose 52 and thus the refueling tank. In this example, the coupling 140 is in the form of a universal joint or the like (also referred to as a universal coupling, a Cardan joint, a Hardy-Spicer joint or a Hooke's joint, and so on), and is thus configured for allowing relative rotation between the body 110 and the hose 52 in three degrees of freedom.

In alternative variations of this example and in other examples, the coupling can instead be configured for allowing relative rotation between the body 110 and the hose 52 in one degree of freedom, or in two degrees of freedom. In particular, the coupling allows the body 110, and in particular the boom member 130 to freely pivot with respect to the hose 52, in particular the second end 54, about at least one axis, so that the spatial orientation of the refueling device 100 can be controllably changed without significant mechanical resistance thereto being generated by the hose 52 such an axis, which is typically parallel the pitch axis P of the refueling device 100, but may be alternatively inclined to the pitch axis P and/or to the roll axis R and/or to the yaw axis Y.

In alternative variations of this example the coupling 140 can be omitted and replaced with a fixed coupling that is configured to maintain a fixed relative spatial disposition between the body 110 and the hose 52 (in particular between the body 110 and the second end 54) while maintaining fluid communication between the lumen 120 and the hose 52. For example such a spatial disposition can be an angle μ (see FIG. 7) of about 0'; or about 30°; or in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°.

The boom member 130 is pivotably mounted to body 110 about axis C (generally parallel to the pitch axis P of the body 110) at pivot joint 119, and is reversibly pivotable between a stowed or boom retracted position BRP (shown in the rightmost receiver refueling device in FIG. 7) and a boom deployed position BDP (FIGS. 1(a) to 2(b). The boom member 130 is typically in the retracted position RP during flight operations excluding actual in-flight operations to reduce drag, while during in-flight refueling operation the boom member 130 is in the boom deployed position BDP.

In at least this example, at least during refueling operation the fuel delivery nozzle 135 is longitudinally forward of the neutral point NP by a longitudinal spacing. As is well known in the art the neutral point of an air vehicle is the position at which the center of gravity needs to be located to provide the aircraft with neutral stability. In practice conventionally, the center of gravity of many conventional air vehicles is often not located at the neutral point, and the distance between the two is referred to as the static margin. The static margin is "positive" if the center of gravity is located forward of the neutral point, providing the aircraft with positive stability, or "negative" if the center of gravity is located aft of the neutral point, providing the aircraft with negative stability. In at least this example, the device 100 is configured with positive stability, and the neutral point NP thereof is located aft of the center of gravity CG.

It is also to be noted that in practice, the fuel delivery nozzle 135 is spaced below the underside 115 of the body 110 by a transverse spacing to provide sufficient clearance with respect to the receiver aircraft 20, and thereby minimize risk of collision between the receiver aircraft 20 and the body 110.

While in at least this example, the boom member 130 is configured as an elbowed boom, in alternative variations of this example the boom member 130 is configured as a rectilinear boom or as a curved boom.

In the stowed or boom retracted position BRP, boom member 130 is pivoted about axis C into a position where the terminus 136 is closest to the lower side 110B of body 110. In the boom deployed position BDP, boom member 130 is variably pivoted about pivot axis C in a downward direction to provide a desired orientation with respect to the fuel receptacle of the receiver aircraft 20.

In any case, in general the boom member 130 is in the boom deployed position BDP at least during in-flight refueling operation of the device 100.

A suitable actuation mechanism (not shown) is provided for controllably pivoting the boom member 130 between the stowed or boom retracted position BRP and the boom deployed position BDP.

The refueling device 100, in particular the boom member 130, nozzle 135 and lumen 120 can be sized to allow suitable fuel flow rates for refueling a wide range of receiver aircraft. By way of non-limiting example, relative high fuel flow rates (for example up to 1000 US gallons/6,500 lb per minute) can be provided for refueling operations of large aircraft (for example transport aircraft, bombers, etc.), while for fighter aircraft that cannot accept fuel at the maximum flow rate of the refueling device 100, the refueling pressure can be correspondingly reduced. Alternatively the refueling device 100, in particular the boom member 130, nozzle 135 and lumen 120 can be sized to allow suitable fuel flow rates for refueling a narrow range of receiver aircraft, for example only fighter aircraft or only larger aircraft (for example about 400 US gallons/2,600 lb per minute).

The spatial control system 160 is configured for controlling a spatial disposition of the refueling device 100 when towed aft of the tanker aircraft 12 via the hose 52, and enables the refueling device 100 to be steered and/or to adopt any desired stable spatial disposition while being towed at the end 54 of hose 52.

In particular, and referring to FIG. 2(a), spatial control system 160 is configured for selectively and controllably providing a non-zero angular disposition, angle λ, between the aft boom axis BAA of the boom member 130 and the forward direction A, and enables this angle λ to be selectively maintained between the boom axis BAA and the forward direction A at least for a part of the time when the refueling device 100 is being towed by the tanker aircraft 12 via hose 52, in particular during the engagement operation of the fuel device 100 to the receiver aircraft 20 and during refueling thereof.

The spatial control system 160 is also configured for providing stability to the refueling device 100, while tethered to and towed by the tanker aircraft 12 via the hose 52, and while the aft boom axis BAA is at any desired pitch and/or yaw and/or roll angle to provide the aforesaid angle λ.

In particular, angle λ is such as to provide a design angle that is within a particular angular range which corresponds to the design relative angular position of the boom member 130 (in particular the design relative angular position of the aft boom axis BAA) with respect to the receiver aircraft 20. Thus, at the design angle the aft boom axis BAA is in an engagement enabling orientation with respect to the receiver aircraft 20, and in particular with respect to the fuel receptacle 22.

In non-limiting examples, angle λ (and in particular the design angle) can be in a range between about 5° and about 85°; or in a range between about 10° and about 80°; or in a range between about 15° and about 70°; or in a range between about 20° and about 60°; or in a range between about 25° and about 50°; or in a range between about 20° and about 40°; or in a range between about 25° and about 40°; or in a range between about 28° and about 32°. In one non-limiting example, the design angle can be about 30°, and operation of the refueling device 100 to adopt this angle automatically renders it compatible for use with existing receiver aircraft 20, in which the fuel receptacles 22 are configured for receiving and engaging with a nozzle at the end of a boom where the boom is at about 30° to the longitudinal axis of the receiver aircraft, without the need for modifying the configuration of the fuel receptacle thereof.

Thus, when angle λ is equal to the design angle, the receiver aircraft 20 travelling along direction A with zero angle of attack and zero sideslip and zero roll, and aft boom axis BAA is at the required spatial orientation to the forward direction A of the tanker aircraft and the receiver aircraft such as to ensure engagement between the nozzle 135 in the fuel receptacle 22, without the need for modifying the configuration of the fuel receptacle thereof.

In this example, the spatial control system 160 comprises a selectively controllable aerodynamic control system 170, comprising a forward set 172 of aerodynamic control surfaces 173 mounted to body 110 at a forward portion thereof, and an aft set 174 of aerodynamic control surfaces 175 mounted to the body 110 at an aft portion thereof. The aft set 174 is thus in aft spaced relationship with respect to the forward set 172, and the center of gravity CG of the body 110 is disposed longitudinally intermediate the aft set 174 and the forward set 172, noting that the actual longitudinal position of the center of gravity CG can shift between two extreme longitudinal positions according to, inter alia, whether the boom member 135 is extended or retracted, and whether fuel is present in the refueling device 100 or absent therefrom.

It is to be noted that at least in this example, the center of gravity CG is forward of the neutral point NP.

In alternative variations of this example and in other examples, the center of gravity can be forward of both the forward set and the aft set of aerodynamic surfaces, which are configured to provide the required stability to the refueling device 100 with the boom axis 131 at any desired pitch and/or yaw and/or roll angle.

In at least this example, the spatial control system 160 of refueling device 100, in particular the selectively controllable aerodynamic control system 170, is configured for enabling the device 100 to be steered in one, or two, or three degrees of freedom in translation and in one, or two, or three degrees of freedom in rotation, independently of the tanker aircraft 12 or of the refueling aircraft 20. Thus, the spatial control system 160, in particular the selectively controllable aerodynamic control system 170, is configured providing:
one or more of: sideslip, up/down translation, forward-aft translation, relative to the tanker aircraft 12 and/or to the refueling aircraft 20, independently of rotational moments in roll pitch and/or yaw;
and/or
rotational moments in one or more of roll pitch and/or yaw, relative to the tanker aircraft 12 and/or to the refueling aircraft 20, independently of sideslip, up/down translation, forward-aft translation.

The spatial control system 160 is also configured for providing an angle of attack for the body 110 with respect to the forward direction, for example up ±10°.

In at least this example, the forward set 172 of aerodynamic control surfaces 173 is in the form of a H-canard arrangement at a forward part of the body 110, comprising swept back canards, mounted to the forward part of body 110, and comprising vertical fins above and below port and starboard canard wing tips of the canards. While in at least this example, the canards are fixed, and comprise pivotable surfaces to provide control moments to the device 100, in alternative variations of this example the canards can instead be pivotable. Furthermore, the canard vertical fins, are each pivotable or can instead comprise pivotable surfaces to provide control moments to the refueling device 100.

The aft set 174 of control surfaces 175 is in the form of a H-tail arrangement, comprising swept back wings, mounted to the aft part of body 110, and comprising vertical fins above and below port and starboard wing tips of the wings. While in this example the swept back wings are fixed, and comprise pivotable surfaces to provide control moments to the device 100, in alternative variations of this example the swept back wings can instead can be pivotable. The wing vertical fins are each pivotable or can instead comprise pivotable surfaces to provide control moments to the refueling device 100.

However, other arrangements are also possible for selectively controllable aerodynamic control system 170 and/or for the body 110.

For example the forward set 172 of aerodynamic control surfaces 173 and/or the aft set 174 of aerodynamic control surfaces 175 can each be configured to have any one or more of the following features, in any combination:
monoplane configuration, including any one of: high wing configuration (or shoulder wing configuration), low wing configuration or mid wing configuration mounted on or near an upper part, a lower (bottom) part of in-between the upper and lower part, respectively, of the body 110; parasol wing configuration— mounted to the body 110 via cabane struts of the like; shoulder wing configuration;

biplane, triplane, quadruplane, multiplane configurations, having two, three four, or more than four wing plane elements, respectively, of similar size or dissimilar size with respect to one another, stacked one above the other in unstaggered, or forward staggered, or backwards staggered arrangement;

combined or closed wing configurations, in which two or more wing elements are joined structurally at or near the respective wing tips in some way; for example a box wing configuration, in which at least one set of overlying (staggered or unstaggered) wing elements is joined together between their tips by vertical fins; tandem box wings; rhomboidal wings in which at least one set of overlying wing elements has a forward swept wing plane and a swept back wing plane, joined between the tips directly or via a vertical fins; annular or ring wing, which can be flat (in the form of the rim of a flat disc) or cylindrical (the wing is shaped as a cylinder), for example;

at least one wing element is cantilevered (self-supported) and/or externally supported to the body 110 via struts and/or braces;

wings elements, wherein each can comprise low aspect ratio, moderate aspect ratio or high aspect ratio;

wings elements, wherein each wing element can be swept forward or swept back or have zero sweep, and/or the sweep angle can be fixed or varied along the span, and/or each wing element can have fixed wing geometry or variable wing geometry, for example variable sweep or oblique wing configurations;

wings elements, wherein each wing element can have a respective wing chord that can be fixed or varied along the span of the wing element, for example including at least one of the following plan shapes: elliptical plan; constant chord plan, tapered plan; trapezoidal plan; reverse tapered plan; compound tapered plan;

wings elements, wherein each wing element can be based on a delta design, including at least one of the following: regular delta; cropped delta (wing tip is cropped) compound delta; double delta; ogival delta;

wings elements, wherein each wing element can have dihedral or anhedral angle;

wings elements, wherein the wing elements can be formed as fins, for example in cruciform "X" or cruciform "+" configuration, or having one, two, three, four, or more than four fins arranged on the body 110 in any geometrical arrangement;

wings elements, wherein the wing elements can comprise vertical fins or the like, attached on the upper part and/or the lower part at any spanwise position including the tip; and/or the fins can be swept forward or swept back or have zero sweep, and/or sweep angle can be fixed or varied along the span, and/or each vertical fin can have fixed wing geometry or variable wing geometry, for example variable sweep or oblique wing configurations;

each wing element can be fixed, or can be movably mounted to the body 110 and fully pivotable to operate independently as an integral control surface, or can be fixedly mounted to the body 110 and comprises a pivotal control surface;

each wing element can be movably mounted to the body 110 to allow for selective relative translational movement therebetween.

For example, the forward set 172 of aerodynamic control surfaces 173 can have any other suitable configuration regarding its geometrical and spatial relationship with respect to the aft set 174 of aerodynamic control surfaces 175, for example as follows:

conventional configuration, in which the forward set 172 of aerodynamic control surfaces 173 forms the main lift-generating wing arrangement of the device 100, while the aft set 174 of aerodynamic control surfaces 175, forms part of the stabilizer or tail;

alternative canard configuration, in which the aft set 174 of aerodynamic control surfaces 175 forms the main lift-generating wing arrangement of the device 100, while the forward set 172 of aerodynamic control surfaces 173 can be in the form of canards or fins in cruciform configuration as the stabilizer;

tandem configuration, in which both the aft set 174 of aerodynamic control surfaces 175 and the forward set 172 of aerodynamic control surfaces 173 are configured to provide lift and to provide stability;

tailless configuration, in which the forward set 172 of aerodynamic control surfaces 173 is omitted, and the aft set 174 of aerodynamic control surfaces 175 is configured to provide lift and to provide stability;

three-surface or triplet configuration, in which in which the aft set 174 of aerodynamic control surfaces 175 forms the main lift-generating wing arrangement of the device 100, while the forward set 172 of aerodynamic control surfaces 173 can be in the form of canards or fins forming part of the stabilizer, and further comprising a third set of aerodynamic control surfaces aft of the aft set 174 of aerodynamic control surfaces 175, forms part of the stabilizer.

For example the forward set 172 of aerodynamic control surfaces 173 and/or the aft set 174 of aerodynamic control surfaces 175 can optionally be blended with the body 100 to provide a blended body configuration.

For example one of the forward set 172 of aerodynamic control surfaces 173 and/or the aft set 174 of aerodynamic control surfaces 175 can be omitted, and the other one of forward set 172 of aerodynamic control surfaces 173 and/or the aft set 174 of aerodynamic control surfaces 175 can be formed as a flying wing configuration, incorporating therein the functions of body 110, which can then be omitted.

For example the forward set 172 of aerodynamic control surfaces 173 and/or the aft set 174 of aerodynamic control surfaces 175 can both be omitted, and the body 110 can be formed as a lifting body, integrally providing the functions of the aerodynamic control system 170.

For example, the aerodynamic control system 170 can be replaced with or supplemented by reaction control thrusters.

According to an aspect of the presently disclosed subject matter, the longitudinal displacement control system 200 is different from the spatial control system 160.

The longitudinal displacement control system 200 can be operated to selectively provide longitudinal displacements to the refueling device 100, and/or can be operated as an aerodynamic stabilizer arrangement.

Figure 1B:
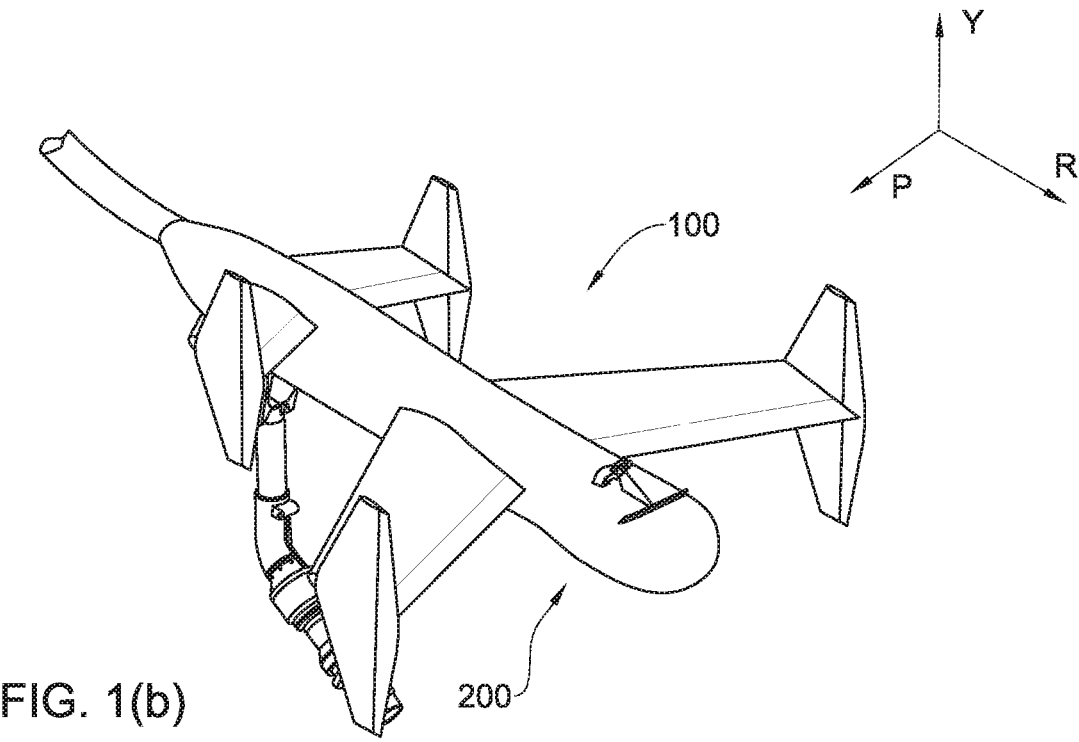
FIG. 1(b) is an aft-top isometric view of the refueling device according to the example of FIG. 1(a), with the respective longitudinal displacement control system in the fully retracted position.
Figure 5:
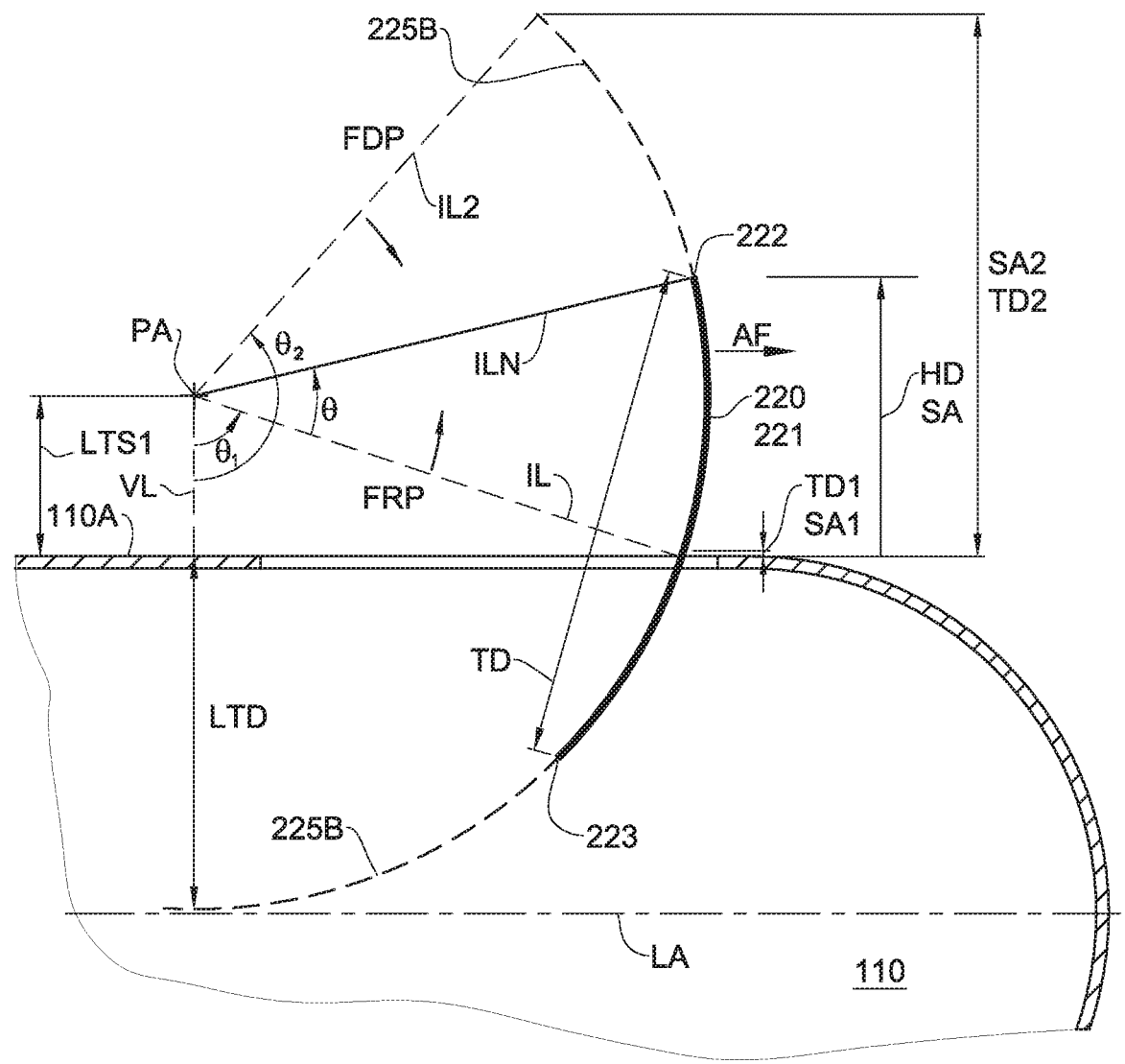
FIG. 5 is a detail cross-sectional side view of part of the aft end of the refueling device according to the example of FIG. 4, showing angular dispositions of the respective panel element of the longitudinal displacement control system at various deployed positions.

Referring to FIGS. 1(*a*) to 4, and in particular to FIG. 5, the longitudinal displacement control system 200 comprises, in this example, two panel elements 220; an upper panel element 220A, and a lower panel element 220B.

Each panel element 220 is controllably and reversibly deployable incrementally to each one of a plurality of successive deployed positions between a fully retracted position and a fully deployed position. FIGS. 1(*a*) and 2(*a*) show the panel elements 220 in the fully deployed position, while FIGS. 1(*b*) and 2(*b*) show the panel elements 220 in the fully retracted position.

In at least this example, the two panel elements 220A, 220B are essentially identical; thus when referring herein to a panel element 220, such reference refers to each one of the two panel elements 220A, 220B.

In at least this example, each panel element 220 is in the form of a curved plate 221, having a concave cylindrical surface 225 facing the forward direction A and a center of curvature 231, and a convex cylindrical surface 226 facing away from the forward direction A and spaced from concave cylindrical surface 225 by panel thickness t. The concave cylindrical surface 225 comprises arc-shaped cross-sections 225C, each subtending a non-zero angle ω at the center of curvature 231, this angle ω being the central angle corresponding to the arc length 225F of the cross-section 225C. Each arc-shaped cross-section 225C is part of an imaginary circle 225B, having a center 225A and radius 225R, and the center of curvature 231 is thus a lateral axis joining the centers 225A of all the respective circles 225B.

While in at least this example each panel element 220 is in the form of a curved plate having a circular cross section, in alternative variations of this example each panel element 220 can have any other suitable cross-sectional shape, for example oval or elliptical cross-section, polygonal cross-section, super-elliptical cross-section, flat cross-section, and so on. In each case, including at least the illustrated example, the respective panel element is pivotably mounted to the body about a pivot axis that is ahead of the panel element and is spaced from the panel element by the moment arm or radius, in the illustrated example the radius 225R.

Referring in particular to FIG. 1(a) and FIG. 3(a), the panel element 220, in particular the curved plate 221, has a width or lateral dimension LD. While the lateral dimension LD, in at least this example, is smaller than a width or lateral dimension W of the body 110 (at the location of the panel element 220 with respect to the body 110), the potential effect of the panel element 220 in providing a controllable aft force AF, with respect to the lateral dimension LD can be maximized by maximizing the lateral dimension LD with respect to the body 110. Accordingly, in at least this example, the lateral dimension LD is the largest possible (while still less than lateral dimension W) to enable the panel member 220 to also fit laterally within the body 110 in the retracted position.

Referring in particular to FIG. 3, FIG. 3(a) and FIG. 5, the panel element 220, in particular the curved plate 221, has rectilinear transverse outer edge 222 and rectilinear transverse inner edge 223, and curved lateral edges 224 and 225. Furthermore, the panel element 220, in particular the curved plate 221, has a height or transverse dimension TD, generally orthogonal to the lateral dimension LD. The transverse dimension TD is defined as the chord 225D corresponding to the arc length of the cross-section 225C. While the longitudinal projection LTD of transverse dimension TD in the fully retracted position, in at least this example, is smaller than a height or transverse dimension H of the body 110 (at the location of the panel element 220 with respect to the body 110), the potential effect of the panel element 220 in providing a controllable aft force AF, with respect to the transverse dimension TD can be maximized by maximizing the transverse dimension TD with respect to the body 110, particularly in the fully deployed position. Accordingly, in at least this example, the transverse dimension TD is the largest possible (while the longitudinal projection LTD of transverse dimension TD still less than transverse dimension H) to enable the panel member 220 to also fit transversely within the body 110 in the retracted position. Since in at least this example there are two panel members 220 mounted to the body at the same longitudinal position, the transverse dimension TD is such that the longitudinal projection LTD of transverse dimension TD, in at least this example, is correlated to (and is less than) half of the transverse dimension H of the body 110 (at the location of the panel element 220 with respect to the body 110).

Furthermore, in at least this example, for a given body height H, the transverse dimension TD can be increased while maintaining the longitudinal projection LTD of transverse dimension TD at less than H/2 by increasing the transverse spacing between the pivot axis PA and the respective upper side 110A or lower side 110B of the body 10, or by increasing the transverse spacing between the respective pivot axis PA and the longitudinal axis LA Thus, each panel element has a width or lateral dimension LD, and a height or transverse dimension TD, and a corresponding height to width aspect ratio AR. In at least this example, the aspect ratio AR is less than 1, typically in the range about 0.3 to 0.9, and more specifically the aspect ratio AR is about 0.8. However, in alternative variations of this example, the aspect ratio AR can be 1 or greater than 1.

In at least this example, the each panel member 220 has a uniform thickness t and thus the convex cylindrical surface 226 also shares the center of curvature 231.

In at least this example, angle ω is in the range between 60° and 90°, and more specifically in at least this example angle ω is about 78°.

In at least this example, the curvature (1/radius 225R) of the concave cylindrical surface 225 and the transverse dimension TD are related to angle ω via the following geometrical relationship:

(transverse dimension TD)/(2*radius 225R)=sin (ω/2)

Figure 4:
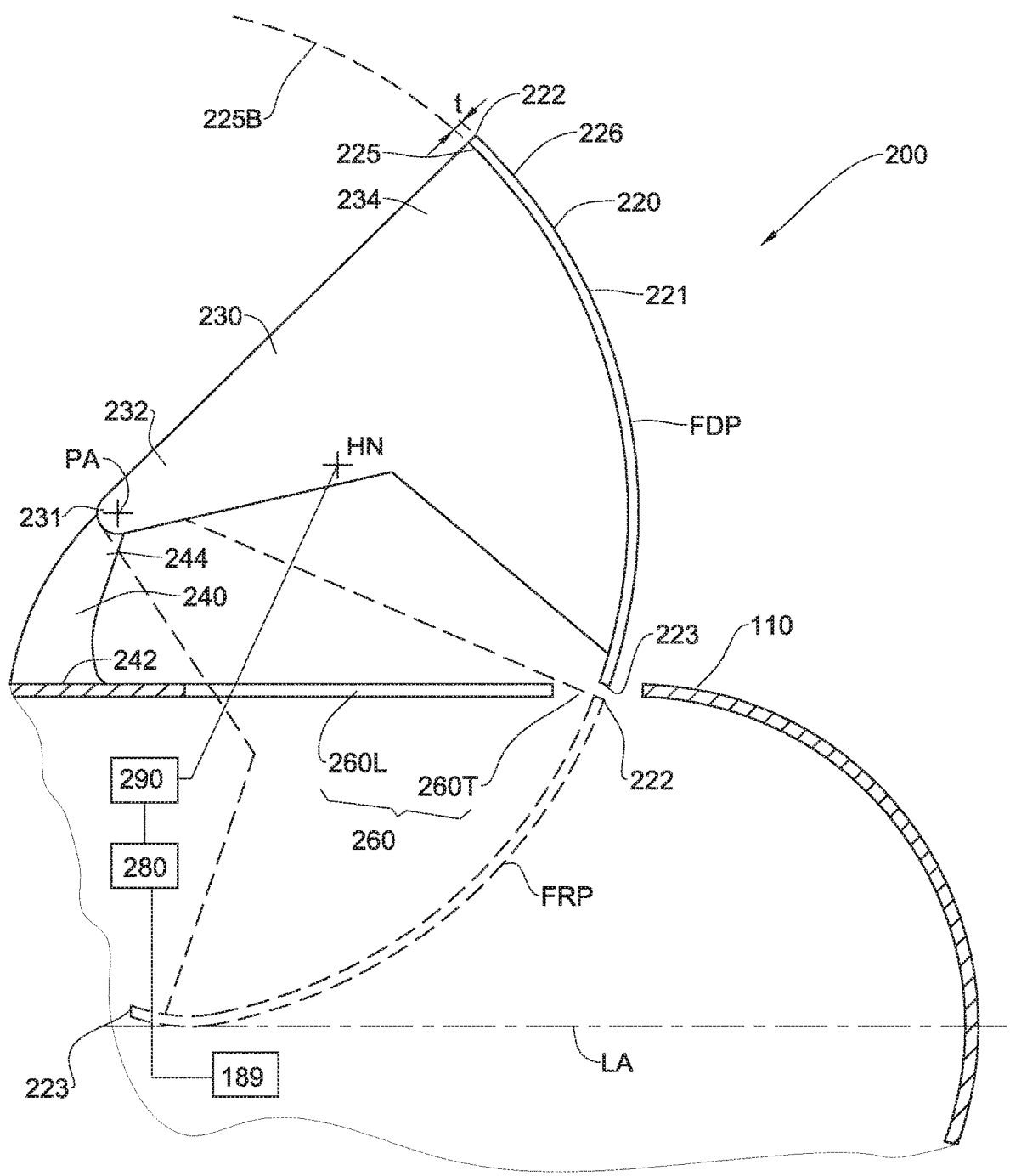
FIG. 4 is a detail cross-sectional side view of part of the aft end of the refueling device according to the example of FIG. 3.

Referring in particular to FIG. 2(a) and FIG. 4, each panel element 220 further comprises a structural member in the form of at least one web 230 (also interchangeably referred to herein as web member or web element), interconnecting the plate 221 to the pivot axis PA. Each web 230 is generally in the form of a sector of the circle 225B, having a relatively large aft end 234 joined to the curved plate 221 at the concave cylindrical surface 225, and a relatively smaller forward end 232. In at least this example, the web 230 is aligned generally parallel to the yaw-roll plane of the refueling device 100.

Each panel element 220 is pivotably mounted to device 100 to allow for pivoting of the panel element 220 about a respective pivoting axis PA that is co-axial with the respective center of curvature 231.

In at least this example, and referring in particular to FIG. 3, the upper panel element 220A is pivoted (at the respective pivot axis PA) with respect to an upper side 110A of body 110, while the lower panel element 220B is pivoted (at the respective pivot axis PA) with respect to a lower side 110B of body 110. In alternative variations of this example, and in other examples, the device 100 can include two such panel elements 220, but pivotably mounted instead one panel element 220 to the port side and the other panel element 220 to starboard side of the body 110. In yet other alternative variations of this example, and in other examples, the device 100 can include three such panel elements 220, in which one such panel element 220 is pivotably mounted with respect to the upper side 110A of body 110 or with respect to a lower side 110B of body 110, and in which the other two panel elements 220 are pivotably mounted one to the port side and the other one to the starboard side of the body 110. In yet other alternative variations of this example, and in other examples, the device 100 can include four such panel elements 220, one such panel element 220 is pivotably mounted with respect to the upper side 110A of body 110, another panel element 220 is pivotably mounted with respect to a lower side 110B of body 110, and the other two panel elements 220 are pivotably mounted one to the port side and the other one to the starboard side of the body 110. In yet other alternative variations of this example, and in other examples, the device 100 can include only a single panel element, and this can be pivotably mounted with respect to the upper side 110A of body 110, or with respect to a lower side 110B of body 110.

In any case, and at least in this example, the upper panel element 220A is pivoted with respect to an upper side 110A of body 110 at a first longitudinal position LC1, i.e., the respective pivoting axis PA is longitudinally at first longitudinal position LC1. The lower panel element 220B is pivoted with respect to a lower side 110B of body 110 at a second longitudinal position LC2, i.e., the respective pivoting axis PA is longitudinally at second longitudinal position LC2. Furthermore, in at least this example the first longitudinal position LC1 is identical to the second longitudinal position LC2. In at least this example, the first longitudinal position LC1 and the second longitudinal position LC2 are within a range 60% to 90% of a longitudinal dimension LB of the body 110, specifically about 84% of dimension LB from the front end of the body 110.

Furthermore, and referring in particular to FIG. 3, in at least this example each pivoting axis PA is located longitudinally aft of a center of gravity CG of the refueling device 100, and also aft of the neural point NP of the refueling device 100.

In at least this example each pivoting axis PA is transversely located at a transverse position outside of the body 100. In at least in this example, the upper panel element 220A is pivoted with respect to an upper side 110A of body 110 at a first transverse position LT1, i.e., the respective pivoting axis PA is transversely located at first transverse position LT1, and spaced from the respective upper side 110A. The first transverse position LT1 is transversely spaced from the upper side 110A by a body transverse spacing LTS1, and from the longitudinal axis LA by a first transverse spacing TS1. The lower panel element 220B is pivoted with respect to a lower side 110B of body 110 at a second transverse position LT2, i.e., the respective pivoting axis PA is transversely located at second transverse position LT2. The second transverse position LT2 is transversely spaced from the lower side 110B by a body transverse spacing LTS2, and from the longitudinal axis LA by a second transverse spacing TS2.

Furthermore, in at least this example the first transverse position LT1 is transversely disposed with respect to the upper side 110A in a similar manner (but in an opposed transverse direction) to the disposition of the second transverse position LT2 with respect to the lower side 110B. In at least this example, the first longitudinal position LC1 and the second longitudinal position LC2 are within a range 15% to 50% of a transverse dimension H of the body 110, for example about 32% of transverse dimension H.

Referring in particular to FIGS. 2(*a*), 2(*b*) and 4, the longitudinal displacement control system 200 further comprises a bracket element 240 for each panel element 220, each bracket element having a base part 242 and a free end 244. Each bracket element 240 projects outwardly from the respective upper side 110A or lower side 110B, and is fixed to the respective upper side 110A or lower side 110B via the respective base part 242. Each panel element 220 is pivotably mounted to the respective bracket element 240 at the respective free end 244 thereof, via the forward end 232 of the respective web 230.

In at least this example, each pivoting axis PA is parallel to the pitch axis P of the refueling device 100.

Referring in particular to FIGS. 2(*a*), 2(*b*) and 4, the body 110 comprises a corresponding slot 260 for each panel element 220, into which the respective panel element 220 is reversibly retracted into in the respective fully retracted position FRP. The slot 260 is generally T-shaped having a longitudinal slot portion 260L corresponding to the stem of the "T", and a transverse slot portion 260T corresponding to the top bar of the "T". The longitudinal slot portion 260L is configured for receiving therein the web member 230, while the transverse slot portion 260T is configured for receiving therein the panel element 220 itself, i.e., the curved plate 221.

Referring to FIG. 5, the panel element 220 is selectively pivotable about pivot axis PA to any desired angular disposition $\theta$ corresponding to the desired deployed position, the desired angular disposition $\theta$ being between a first angular disposition $\theta 1$ and a second angular disposition $\theta 2$.

The angular difference between the first angular disposition $\theta 1$ and the second angular disposition $\theta 2$ corresponds to the angle $\omega$ of the panel element 220.

The first angular disposition $\theta 1$ corresponds to the fully retracted position FRP, in which the respective panel element 220 is maximally retracted into the body 110, and is thus minimally exposed to any airflow over the body 110, for example as is normally present during in-flight refueling operations. The first angular disposition $\theta 1$ can be defined as the angle between a vertical line VL passing through the pivot axis PA in FIG. 5, and a first imaginary line IL1 joining the outer transverse edge 222 (at the fully retracted position FRP) with the pivot axis PA in the side view shown in FIG. 5.

The second angular disposition $\theta 2$ corresponds to the fully deployed position FDP, in which the respective panel element 220 is maximally deployed from the body 110, and is thus maximally exposed to any airflow over the body 110, for example as is normally present during in-flight refueling operations. The second angular disposition $\theta 2$ can be defined as the angle between the vertical line VL passing through the pivot axis PA in FIG. 5, and a second imaginary line IL2 joining the outer transverse edge 222 (at the fully deployed position FDP) with the pivot axis PA in the side view shown in FIG. 5.

At any desired angular disposition $\theta$ intermediate between the first angular disposition $\theta 1$ and the second angular disposition $\theta 2$, i.e., at the corresponding desired deployed position DP, the respective panel element 220 is partially deployed from the body 110, and is thus partially exposed to any airflow over the body 110, for example as is normally present during in-flight refueling operations. Each desired angular disposition $\theta$ can be defined as the angle between the vertical line VL passing through the pivot axis PA in FIG. 5, and a corresponding imaginary line ILN joining the outer transverse edge 222 (at the corresponding deployed position DP) with the pivot axis PA in the side view shown in FIG. 5.

Each panel element 220 defines a front panel projected area SA orthogonal to the body longitudinal axis LA. As will become clearer herein, each panel element 220 is controllably and reversibly deployable incrementally to each one of a plurality of successive desired deployed positions DP between the fully retracted position FRP and the fully deployed position FDP, to provide a respective reversible incrementally increasing aft force AF to the refueling device 100 at least during the in-flight refueling operation. The projected area SA is thus defined on a plane orthogonal to the body longitudinal axis LA, and refers to the area projected by the panel element 220 on this plane at the particular deployed positions DP. Thus, the projected area SA is the product of the exposed height HD of the panel element 220 (i.e., the transverse spacing of the outer edge 222 with respect to the respective top side 110A or bottom side 110B, at the particular deployed positions DP) and the lateral dimension LD of the panel element 220, i.e.:

$$SA=HD*LD.$$

It is to be noted that the particular aft force AF generated by the partially exposed panel element 220 in such a deployed position DP is proportional to the corresponding projected area SA, and in particular:

$$AF \propto 0.5*\rho*V^2*SA*C_D$$

Wherein:

$\rho$~is the density of the air surrounding the panel element 220;

V~is the velocity at which the panel element 220 (i.e., the refueling device 100) is traveling with respect to the surrounding air;

$C_D$~is the drag coefficient of the panel element 220 at the particular deployed position DP.

In the fully retracted position FRP the respective panel element 220 is fully retracted within the body 110, and the proportion of the front panel projected area SA1 exposed to the airflow over the body (corresponding to the height TD1 of the outer edge 222 projecting out of the body 110), at least during the in-flight refueling operation, is at a minimum, thereby providing a respective minimum aft force AF, referred to herein as aft force AF1, to the refueling device 100. The front panel projected area SA1 at the fully retracted position FRP is nominally zero, and thus the corresponding minimum aft force AF1 is also nominally zero.

In the fully deployed position FDP the respective panel element 220 is fully deployed from the body 110, and the proportion of the front panel projected area SA2 exposed to the airflow over the body (corresponding to the height TD2 of the outer edge 222 projecting out of the body 110), at least during the in-flight refueling operation, is at a maximum, thereby providing a respective maximum aft force AF, referred to herein as aft force AF2, to the refueling device 100.

The aggregate front panel projected area SA2 (i.e., of the two panel elements 220A and 220B together) at the fully deployed position FDP is nominally about 200% of the frontal cross-sectional area of the body 110, in at least this example. The corresponding aggregate maximum aft force AF2 (provided by the two panel elements 220A and 220B) provides an additional 70% to about 80% (for example nominally about 72%) of the configuration drag in boom deployed configuration BDC, which includes the drag generated by body 110 plus boom member 130 in the boom deployed configuration BDC. Alternatively, the corresponding aggregate maximum aft force AF2 (provided by the two panel elements 220A and 220B) provides an additional 80% to about 95% (for example nominally about 87%) of the configuration drag in the boom retracted configuration BRC, which includes the drag generated by body 110 plus boom member 130 in the boom retracted configuration BRC.

In each successive deployed position DP between the retracted position FRP and the fully deployed position FDP, a corresponding proportion PP of maximum front panel projected area SA2 of the panel element 220 is correspondingly exposed to the airflow, at least during the in-flight refueling operation, thereby providing a corresponding aft force AF to the refueling device. The magnitude of this proportion PP of the maximum front panel projected area SA2 is reversibly incrementally increased from 0 to 1 as the panel element 220 is correspondingly deployed from the fully retracted position FRP to the fully deployed position FDP via the successive deployed positions DP, to thereby provide a controllable and reversibly incrementally increasing aft force AF having a force magnitude respectively increasing from the aforesaid respective minimum aft force AF1 to the aforesaid respective maximum aft force AF2.

Referring in particular to FIG. 4, the longitudinal displacement control system 200 further comprises an actuator system 290 for controllably causing each panel element 220 to be deployed to any desired deployed position DDP intermediate between the respective fully retracted position FRP and the respective fully deployed position FDP. For example, the actuator system 290 can comprise a hydraulic, pneumatic or solenoidal jack, anchored at one end to the inside of the body 110, and having a reciprocal piston having a free end thereof hingedly affixed to the web 230, for example at location HN. When the jack is extended, the panel element 220 is pivoted about the pivot axis PA towards the fully deployed position FDP, and when the piston is retracted the panel element 220 is pivoted about the pivot axis PA towards the fully retracted position FRP.

Referring in particular to FIG. 6 and FIG. 6(a), at any desired deployed position DP, including the fully deployed position FDP, an aerodynamic force TAF is generated by each panel element 220. The aerodynamic force TAF, which is correlated to the respective projected area SA, has a vector having a line of action LOA that intersects the respective pivot axis PA of the respective panel 220 or passes very close to the pivot axis PA.

Without being bound to theory, inventor considers that the overall aerodynamic force TAF acting on panel element 220 is the sum of each element of force acting on each infinitely small geometric element composing the panel 200. Because each of these elements of force is generated by air pressure, each such element of force acts perpendicular to the corresponding infinitely small geometric element. By definition, when such a panel element 220 has a circular cross-section, a line perpendicular to each infinitely small geometric element necessarily intersects the center of the respective circle. Thus, the sum of all of these elements of force also converges toward the center of the circle, where the pivot axis PA is located.

By "very close" is meant that the line of action LOA has a minimum distance to the respective pivot axis PA, that is less than 2% of the transverse dimension TD of the panel 220.

Without being bound to theory, inventor considers that the hinge moment coefficient $C_h$ and the drag coefficient $C_D$ acting on the panel 220 are related by the following relation:

$$C_h \sim C_D * x$$

wherein:

$C_h$ is the hinge moment coefficient defined by: $C_h$=HM [hinge moment]/$(0.5*\rho*V^2*SA*TD)$;

$C_D$ is the drag coefficient defined by: CD=D [drag force]/$(0.5*\rho*V^2*SA)$;

x is the line of action LOA minimum distance to the pivot axis PA as a percentage of the transverse dimension TD of the panel 220.

Calculations and wind-tunnel test results relating to an implementation of the example of the longitudinal displacement control system illustrated in the figures, provided the following nominal values for the respective hinge moment coefficient $C^h$ and the respective drag coefficient $C_D$:

$C_h \sim 0.02$ $C_D \sim 1.1$

Using these values for the hinge moment coefficient $C_h$ and the drag coefficient $C_D$ and applying the above relationship ($C_h \sim C_D^* x$), the corresponding value for minimum distance $x \sim 0.02$ (i.e., about 2% of the transverse dimension TD).

Without being bound to theory, the inventor considers that drag coefficient greater than 1 is generated due to the concavity of the panel elements of at least this example.

It is to be noted that for panel elements 220 having a pure arc circle cross-section of zero thickness, the corresponding hinge moment coefficient $C_h$ is theoretically zero. Without being bound to theory, inventor considers that in practice, however, the finite thickness t of the panel element 220, as well as the presence of the web element 230, in particular the aft end 234, can probably account for the small but finite hinge moment coefficient $C_h$ ($\neq 0$) that was present as referred to above.

Thus, by arranging in this manner to provide the LOA intersecting, at or very close to, the respective pivot axis PA, the actual power necessary for the actuator system 290 to operate and pivot the panel elements 220 between their respective fully deployed position FDP and fully retracted position FRP, and to maintain each panel element at any desired deployed position therebetween, is minimized.

Each panel element 220 has a control arm corresponding to the radius 225R. Since, as discussed above, in practice the hinge moment coefficient $C_h$ for at least this example is finite and non-zero, the size of the radius 225R can influence the magnitude of the hinge moment coefficient $C_h$. As is clear, as each panel element 220 is pivotably deployed to the desired deployed position, the entire concave cylindrical surface 225 moves along the same arc, corresponding to the respective circles 225B.

The vector of the aerodynamic force TAF, and thus of the LOA, is at an angle $\Omega$ to the body longitudinal axis LA, and this angle $\Omega$ varies as the respective panel element 220 is pivoted about its pivot axis PA between its respective fully deployed position FDP and fully retracted position FRP. The aerodynamic force TAF generated by each panel element 220 can be resolved into a respective aft force AF, and a respective transverse force VAF. The aft force AF of the two panels is in the same direction, aft, and thus the total aft force generated by the longitudinal displacement control system 200 is thus 2*AF. On the other hand, by having the two panel elements 220 on the upper side and lower side of the body, the respective transverse forces VAF are in mutually opposite directions, and thus cancel out.

It is to be noted that in alternative variations of this example, in which the longitudinal displacement control system 200 comprises, alternatively or additionally, two panel elements 220 located one on the starboard side and the other one on the port side of the body, the respective aerodynamic force TAF generated by each such panel element 220 can be resolved into a respective aft force AF, and a respective lateral force VAF, in which the aft force AF of the two panels is in the same direction, aft, and thus the total aft force generated by the longitudinal displacement control system 200 is thus 2*AF, and in which the lateral force components are in mutually opposed directions and thus cancel each other out.

It is to be noted that in alternative variations of this example, the longitudinal displacement control system 200 comprises one rather than two panel elements transversely located with respect to the body 110, for example only on the upper side 110A or only on the lower side 110B (and optionally also two lateral panel elements 220). In such cases, the respective transverse force VAF can include a nose up or nose down pitching moment to the refueling device 100, which can be counteracted or balanced using the spatial control system of the refueling system 100, for example.

Referring again to FIG. 4, the longitudinal displacement control system 200 further comprises a controller 280 for controlling operation of the actuator system 290 to thereby control the magnitude of the aft force AF generated by the exposed panel elements 220 at each respective deployed position up to the fully deployed position FDP, as will become clearer herein, essentially by controlling the aforesaid proportion PP of front panel projected area.

The controller 280 is in particular configured for controlling, via the actuator system 290, the magnitude of the aft force AF to provide and maintain a tension in the hose 50 within a predetermined tension range, and/or for controlling, actuator system 290, the magnitude of the aft force AF to provide a desired forward or aft displacement of the refueling device 100 with respect to the tanker aircraft 12.

For example, the controller 200 comprises any suitable computer control system, and can be internally or externally mounted in the refueling device 100. In alternative variations of this example and in other examples, the controller 200 or portions thereof can instead comprise any suitable electronic control unit, or any other suitable control unit, and/or the controller 200 or portions thereof can be comprised elsewhere in the in-flight refueling system 50 or in the tanker aircraft 12.

It is to be noted that at least in this example, operation of the actuator system 290 for selectively deploying and retracting the two panel elements 220 is synchronized, such that each of the two panel elements 220 is deployed or retracted by the same amount (in particular by the same angular displacement $\theta$) and concurrently, responsive to operation of the actuator system 290.

Figure 2B:
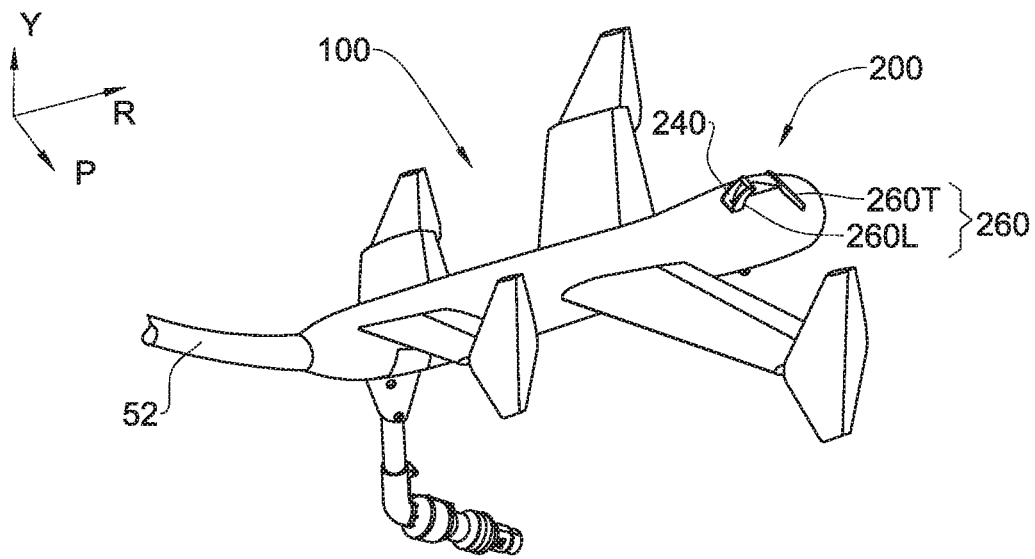
FIG. 2(b) is an front-top isometric view of the refueling device according to the example of FIG. 1(a), with the respective longitudinal displacement control system in the fully retracted position.

The refueling device 100 can optionally further comprise a force generating arrangement, configured for selectively generating a force FB (see FIG. 2(b)) along the aft boom axis BAA in a direction towards nozzle 135 from elbow 131.

For example, the force generating arrangement comprises: (a) at least some elements of the spatial control system 160, in particular the selectively controllable aerodynamic control system 170; and optionally (b) at least some elements of longitudinal displacement control system 200.

The force generating arrangement can be configured for selectively generating force FB in a direction aligned with the aft boom axis BAA by generating a negative lift force LF (or reducing the lift force by force LF) and a drag force LD, which together provide force FB of the required magnitude and vector. The negative lift force LF can be generated by suitably controlling the spatial control system 160, in particular the selectively controllable aerodynamic control system 170. For example, appropriately changing an angle of attack, and/or providing a flap angle to the respective control surfaces of the control system 170 can reduce the lift generated by the control system 170, and thus result in a net downwards force corresponding to negative lift force LF. Concurrently, in at least some cases, the drag force LD can also be generated by suitably controlling the spatial control system 160, in particular the selectively controllable aerodynamic control system 170. For example, appropriately changing an angle of attack, and/or providing a flap angle to the respective control surfaces of the control system 170 can also change the drag generated by the control system 170, and thus result in an increase in drag corresponding to drag force LD. Additional drag force can be generated, where necessary to complement or replace the drag generated by the control system 170 to provide the appropriate drag force LD, by controlling the drag generated by the aerodynamic stabilizer arrangement.

The force generating arrangement is in particular configured for selectively generating a force FB having a magnitude sufficient for forcing the nozzle 135 into engagement with the fuel receptacle 22 of the receiver aircraft when the nozzle 135 (and the boom member 130) and the fuel receptacle 22 are in a predetermined relative spatial disposition, i.e., when the refueling device 100 reaches an engagement enabling position and the aft boom axis BAA is in the engagement enabling orientation with respect to the receiver aircraft 20, and in particular with respect to the fuel receptacle 22.

The force generating arrangement is further configured for selectively operating in this manner responsive to the nozzle 135 being in a predetermined proximity to the fuel receptacle 22, i.e. responsive to the nozzle 135 being in a predetermined spacing with respect to the fuel receptacle 22, typically the engagement enabling spatial position, and can be operated manually or automatically to provide such a force FB.

Thus, at the engagement enabling position, when the boom member 130, in particular the aft boom axis BBA, is in a predetermined spatial disposition with respect to the fuel receptacle 22 and the nozzle 135 being in a predetermined spacing with respect to the fuel receptacle 22 (i.e., at the engagement enabling position the aft boom axis BBA is at the engagement enabling orientation—corresponding to the design angle), the force generating arrangement can be selectively actuated to compel the boom member 130 to follow a predetermined trajectory (together with the device 100), for example with the aft boom axis BBA aligned in the direction of the receiver aircraft 20, to ensure alignment and engagement between the nozzle 135 and the fuel receptacle 22. In this example, the boom member 130 (in particular the aft boom axis BBA) is maintained at the engagement enabling orientation—corresponding to the design angle, while the body 110 remains at the same spatial disposition with respect to the receiver aircraft 20. The body 110 is moved towards the receiver aircraft 20 along a the direction of the aft boom axis BAA, maintaining the aft boom axis BAA at the engagement enabling orientation—corresponding to the design angle $\lambda_{des}$, to effect engagement between the nozzle 135 and the fuel receptacle 22. In alternative variations of this example, the boom 130 is telescopic, or at least the aft boom portion 138 is telescopic, and is partially or fully telescopically extended towards the receiver aircraft 20 while the device 100 can be moved towards or away from the receiver aircraft 20 to effect engagement between the nozzle 135 and the fuel receptacle 22.

Once the nozzle 135 is forced into engagement with the fuel receptacle 22 of the receiver aircraft 20, the tanker aircraft 12 can begin refueling the receiver aircraft 20.

In at least this example of the device 100 the controller 280 is also configured for controlling operation of one or more of (a) the force generating arrangement and (b) the spatial control system 160 (in particular the selectively controllable aerodynamic control system 170), in addition to the longitudinal displacement control system 200.

Referring again to FIG. 4, in at least this example the refueling device 100 further optionally comprises a suitable spatial data acquisition system 189, for providing or enabling the calculation of spatial data relating to the relative spatial dispositions between the refueling device 100 and the receiver aircraft 20, in particular the relative spatial dispositions between the fuel delivery nozzle 135 of the refueling device 100 and the fuel receptacle of the receiver aircraft, to enable selectively controlling the refueling device to provide automatic (optionally including autonomous) and/or manual steering of the refueling device 100 to the engagement enabling position and subsequent selective engagement of the fuel delivery nozzle to the fuel receptacle of the receiver aircraft 20.

For example, the data acquisition system is in the form of imaging system, in particular configured for providing imaging data of any object coming within a field of regard (FOR) aft of the refueling device 100. In alternative variations of this example, the imaging system can be replaced with any other suitable data acquisition system for providing the aforesaid spatial data.

In yet other alternative variations of this example and in other examples, the refueling device 100 can omit the spatial data acquisition system 189 and can be actively controlled by an operator, for example, to control the relative spatial position and orientation of the refueling device 100 with respect to the receiver aircraft 20, in particular the spatial position and orientation of the boom member 130, in particular the nozzle 135 with respect to the fuel receptacle 22, so that the nozzle 135 can be selectively and controllably brought into selective engagement with the fuel receptacle 22 in a safe and effective manner, for example via direct visual tracking of the device by one or more operators. For example, such an operator can be in the tanker aircraft 12, and/or such an operator can be in the refueling aircraft 20, and/or such an operator can be in another flying platform, for example a chase aircraft independent of the refueling aircraft 20.

Alternatively, in yet other alternative variations of this example, the refueling device 100 can be operated as a free flying refueling device towed at the end of hose 52, and the relative spatial position and orientation of the refueling device 100 with respect to the receiver aircraft 20 (in particular the position and orientation of the boom member 130 and nozzle 135 with respect to the fuel receptacle 22, so that the nozzle can be controllably brought into selective engagement with the fuel receptacle 22 in a safe and effective manner) is achieved by maneuvering the receiver aircraft 20 only. In such a case, the spatial control system 160 can optionally comprise a non-adjustable aerodynamic stability system that is configured for allowing the refueling device 100 to adopt a particular, pre-set, desired angle λ while maintaining a zero pitching moment (and/or zero yawing moment and/or zero rolling moment), this being the design angle as discussed above for example. Optionally, a suitable air-driven generator can be provided in the refueling device 100 to provide electrical power thereto. Additionally or alternatively, electrical power can be provided to the refueling device 100 by the tanker aircraft 12. Additionally or alternatively, electrical power can be provided to the refueling device 100 by one or more batteries in the refueling device 100. Additionally or alternatively, electrical power can be provided to the refueling device 100 by one or more ram air turbines (RAT), affixed internally or externally with respect to the refueling device 100.

In an alternative variation of the example of FIGS. 1 to 7, the boom member, can instead be configured for being fixedly (i.e. non-pivotably) mounted to the body 110 of the device 100.

In operation of the refueling device 100, with the tanker aircraft 12 flying in the forward direction A and at a velocity suitable for in-flight refueling, the refueling device 100 is deployed from the tanker aircraft 12, and is displaced aft to a desired distance via the hose 52. Suitable sensors, typically operatively connected to the drum from which the hose 52 is deployed, determine the tension in the hose 52. If it is determined that there is insufficient tension, the longitudinal displacement control system 200 is operated to deploy each of the panel elements 220 from the fully retracted position FRP to a deployed position DP wherein the corresponding aft force AF generated thereby is sufficient to increase the tension in the hose 52. If there is too much tension, the panel elements 220 are retracted partially or fully to the fully retracted position FRP. Furthermore, when a receiver aircraft 20 approaches for in-flight refueling, the refueling device 100 maneuvers to an engagement-enabling position, using the spatial control system 160 (in particular the selectively controllable aerodynamic control system 170), and the longitudinal displacement control system 200 is operated to deploy each of the panel elements 220 to variable desired deployed positions DP incrementally, to thereby provide controllable and variable aft forces AF, thereby providing fine forward-aft longitudinal control of the refueling device 100 with respect to the receiver aircraft 20, thereby facilitating attaining and maintain the aforesaid enjoyment enabling opposition. Thereafter, the boom member 130 is engaged with the refueling receptacle 22 and refueling of the receiver aircraft 20 can proceed.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A refueling device for use in in-flight refueling operation, the refueling device comprising:
    (a) a body configured for being towed by a tanker aircraft in a forward direction via a fuel hose at least during in-flight refueling operation, the body having a body longitudinal axis;
    (b) a boom member carried by the body, the boom member having a fuel delivery nozzle, the fuel delivery nozzle being configured for selectively engaging with a fuel receptacle in a receiver aircraft to enable fuel to be transferred from said fuel hose to the receiver aircraft during said in-flight refueling operation;
    (c) spatial control system configured for selectively providing stability and control to the refueling device;
    (d) a longitudinal displacement control system, comprising:
        at least one panel element defining a front panel projected area orthogonal to the body longitudinal axis, each said panel element being controllably and reversibly deployable incrementally to each one of a plurality of successive deployed positions between a fully retracted position and a fully deployed position, to provide a respective reversible incrementally increasing aft force to the refueling device at least during the in-flight refueling operation;
    wherein at least one said panel element is in the form of a curved plate having a concave cylindrical surface facing the forward direction, and a center of curvature.

2. The refueling device according to claim 1,
    wherein in the fully retracted position the respective said panel element is retracted within the body and a proportion of said front panel projected area exposed to an airflow over the body, at least during the in-flight refueling operation, is at a minimum, thereby providing a respective minimum said aft force to the refueling device;
    wherein in the fully deployed position the respective said proportion of the front panel projected area of said panel element exposed to the airflow, at least during the in-flight refueling operation, is at a maximum, thereby providing a respective maximum said aft force to the refueling device, and
    wherein in each said successive deployed position a corresponding said proportion of said front panel projected area of the panel element is correspondingly exposed to the airflow, at least during the in-flight refueling operation, thereby providing a corresponding said aft force to the refueling device;
    wherein a magnitude of said proportion of said front panel projected area is reversibly incrementally increased as the panel element is deployed from the fully retracted position to the deployed position via said successive deployed positions to thereby provide a controllable and reversibly incrementally increasing said aft force having a force magnitude respectively increasing from said respective minimum aft force to said respective maximum aft force.

3. The refueling device according to claim 1, wherein the concave cylindrical surface comprises arc-shaped cross-sections, each subtending an angle at the center of curvature of between 60 degrees and 90 degrees.

4. The refueling device according to claim 3, wherein each panel element moves along an arc, corresponding to said curvature, about the respective pivot axis, between said fully retracted position and said fully deployed position.

5. The refueling device according to claim 1, wherein the at least one said panel element is pivotably mounted to the device to allow for pivoting of the at least one said panel element about a pivoting axis co-axial with the center of curvature.

6. The refueling device according to claim 5, wherein said pivoting axis is located longitudinally aft of a center of gravity of the refueling device.

7. The refueling device according to claim 5, including at least one of the following:
    wherein said pivoting axis is located at a longitudinal position between 60% and 90% of a longitudinal dimension of the body; or
    wherein said pivoting axis is located at a transverse position between 15% and 50% of a transverse dimension of the body.

8. The refueling device according to claim 5, wherein each said pivoting axis is transversely located at a transverse position outside of the body.

9. The refueling device according to claim 5, wherein said pivoting axis is parallel to a pitch axis of the refueling device.

10. The refueling device according to claim 1, wherein each said panel element has a height to width aspect ratio in a range 0.3 to 0.9.

11. The refueling device according to claim 1, wherein said body comprises a corresponding slot for each said panel element, into which the respective said panel is retracted into in the respective said fully retracted position.

12. The refueling device according to claim 1, further comprising an actuator for controllably causing each said panel element to be deployed between the respective said fully retracted position and the respective said deployed position.

13. The refueling device according to claim 1, further comprising two said panel elements, and including one of the following:
- wherein one said panel element is mounted with respect to an upper part of the body, and wherein the other said panel element is mounted with respect to a lower part of the body;
- wherein one said panel element is mounted with respect to a port part of the body, and wherein the other said panel element is mounted with respect to a starboard part of the body;
- wherein one said panel element is mounted with respect to an upper part of the body, and wherein the other said panel element is mounted with respect to a lower part of the body, and, wherein the two said panel elements are pivotably mounted to the body at the same longitudinal spacing from a forward end of the body;
- wherein one said panel element is mounted with respect to a port part of the body, and wherein the other said panel element is mounted with respect to a starboard part of the body, and, wherein the two said panel elements are pivotably mounted to the body at the same longitudinal spacing from a forward end of the body;
- wherein one said panel element is mounted with respect to an upper part of the body, and wherein the other said panel element is mounted with respect to a lower part of the body, and, wherein the refueling device is configured for synchronized deployment of the two said panel elements; or
- wherein one said panel element is mounted with respect to a port part of the body, and wherein the other said panel element is mounted with respect to a starboard part of the body, and, wherein the refueling device is configured for synchronized deployment of the two said panel elements.

14. The refueling device according to claim 1, further comprising one of the following:
- a controller for controlling said magnitude of said aft force by controlling said proportion of said front panel projected area;
- a controller for controlling said magnitude of said aft force by controlling said proportion of said front panel projected area, and, wherein said controller is configured for controlling said magnitude of said aft force to provide and maintain a tension in said hose within a predetermined tension range;
- a controller for controlling said magnitude of said aft force by controlling said proportion of said front panel projected area, and, wherein said controller is configured for controlling said magnitude of said aft force to provide a desired forward to aft displacement of the refueling device with respect to the tanker aircraft; or
- a controller for controlling said magnitude of said aft force by controlling said proportion of said front panel projected area, and, wherein said controller is configured for controlling said magnitude of said aft force to provide and maintain a tension in said hose within a predetermined tension range, and, wherein said controller is configured for controlling said magnitude of said aft force to provide a desired forward to at displacement of the refueling device with respect to the tanker aircraft.

15. The refueling device according to claim 1, including one of the following:
- wherein said boom member has refueling nozzle at a free end thereof, and a boom axis passing through the refueling nozzle, wherein at least during in-flight refueling said boom axis is at a non-zero angular deposition with respect to the body axis;
- wherein said boom member has refueling nozzle at a free end thereof, and a boom axis passing through the refueling nozzle, wherein at least during in-flight refueling said boom axis is at a non-zero angular deposition with respect to the body axis, and, wherein the boom member is reversibly pivotable with respect to the body, between a boom stowed position and a boom deployed position, wherein in the boom stowed position the refueling nozzle is closes to the body, and wherein in the boom deployed position engagement with the fuel receptacle of the receiver aircraft is possible; or
- wherein said boom member has refueling nozzle at a free end thereof, and a boom axis passing through the refueling nozzle, wherein at least during in-flight refueling said boom axis is at a non-zero angular deposition with respect to the body axis, and, wherein said boom member is in fixed spatial relationship with respect to the body.

16. The refueling device according to claim 1, including at least one of the following:
- wherein said spatial control system is further configured for selectively providing control moments in at least one of pitch, yaw and roll wherein to enable the refueling device to be flown while towed by the tanker aircraft in said forward direction via said fuel hose; or
- wherein said spatial control system is configured for enabling the refueling device to be steered in one, or two, or three degrees of freedom in translation, and in one, or two, or three degrees of freedom in rotation, independently of the tanker aircraft or of the refueling aircraft.

17. The refueling device according to claim 1, including one of the following:
- wherein said spatial control system comprises selectively controllable aerodynamic control system;
- wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces;
- wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said forward set of aerodynamic control surfaces comprises a canard configuration, and said aft set of aerodynamic control surfaces comprises one or more wing elements;

wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said aft set of aerodynamic control surfaces comprises an H-wing configuration, comprising two vertical wing stabilizers, one each on either side of a respective wing; or wherein said spatial control system comprises selectively controllable aerodynamic control system, and, wherein said selectively controllable aerodynamic control system comprises a forward set of aerodynamic control surfaces mounted to said body, and an aft set of aerodynamic control surfaces mounted to said body in longitudinally aft spaced relationship with respect to said forward set of aerodynamic control surfaces, and, wherein said forward set of aerodynamic control surfaces comprises an H-canard configuration, comprising two vertical canard stabilizers, one each on either side of a respective canard.

18. The refueling device according to claim 1, wherein said longitudinal displacement control system is different from the spatial control system.

19. The refueling device according to claim 1, including one of the following:

wherein the refueling device comprises a force generating arrangement configured for selectively generating a force along said aft boom axis in a direction towards said fuel delivery nozzle;

wherein the refueling device comprises a force generating arrangement configured for selectively generating a force along said aft boom axis in a direction towards said fuel delivery nozzle, and, wherein said force generating arrangement is configured for selectively generating said force along said aft boom axis in a direction towards said fuel delivery nozzle responsive to said fuel delivery nozzle being in predetermined proximity to the fuel receptacle of the receiver aircraft wherein to force said fuel delivery nozzle into engagement with the fuel receptacle;

wherein said body comprises a fuel delivery lumen configured for fluid communication with said fuel hose and said boom member at least during the in-flight refueling operation, wherein said body comprises a coupling having a hose interface configured for connecting said lumen to the fuel hose, said coupling configured for allowing relative rotation between the hose and said body in at least one degree of freedom while maintaining said fuel communication;

wherein the refueling device further comprises a data acquisition system configured for providing spatial data relating to a relative spatial disposition between said fuel delivery nozzle and said fuel receptacle, to enable selectively controlling the refueling device to provide automatic or autonomous or manual engagement of the fuel delivery nozzle to the fuel receptacle of the receiver aircraft; or I wherein the refueling device further comprises a suitable controller for controlling operation thereof.

20. A refueling system comprising a refueling fuel reservoir connected to a refueling device via a hose, the refueling device being as defined in claim 1.

21. A tanker aircraft comprising at least one refueling system as defined in claim 20.

22. A method for in-flight refueling, the method comprising:

providing the tanker aircraft as defined in claim 21;
deploying the refueling device aft of the tanker aircraft when airborne;
operating the longitudinal displacement control system to provide at least one of:
(i) a desired tension in the fuel hose; or
(ii) a desired fore or aft displacement of the refueling device.

* * * * *